(12) United States Patent
Huang et al.

(10) Patent No.: US 6,687,747 B1
(45) Date of Patent: Feb. 3, 2004

(54) SYSTEM AND NETWORK INTEROPERATIONS USING A MIB-BASED OBJECT-ORIENTED SIGNALING PROTOCOL

(75) Inventors: Bill Huang, Alameda, CA (US); Jing Yang, Alameda, CA (US); Yu Shen, El Cerrito, CA (US); Spero Koulouras, Los Gatos, CA (US)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/429,552

(22) Filed: Oct. 28, 1999

(51) Int. Cl.$^7$ .............................................. G06F 13/00
(52) U.S. Cl. ........................ 709/223; 709/230; 709/316
(58) Field of Search ................................ 709/201, 230, 709/238, 245, 246, 249, 250, 313, 316, 227, 223

(56) References Cited

U.S. PATENT DOCUMENTS

| | | | | |
|---|---|---|---|---|
| 5,388,258 A | * | 2/1995 | Larsson et al. | 707/104 |
| 5,579,309 A | * | 11/1996 | Totzke | 370/385 |
| 5,764,915 A | * | 6/1998 | Heimsoth et al. | 709/227 |
| 6,201,862 B1 | * | 3/2001 | Mercouroff et al. | 379/230 |
| 6,298,039 B1 | * | 10/2001 | Buskens et al. | 370/216 |

OTHER PUBLICATIONS

"Reference Model of Open System Interconnection for CCITT Application," ITU–T Recommendation X.200/ISO 7498 (1988).

"Specification of Abstract Syntax Notation One (ASN. 1)," ITU–T Recommendation X.208 / ISO/IEC 88224 (1990).

"Information Technology—Open system Interconnection—Network Service Definition," ITU–T Recommendation X.213 / ISO/IEC 8348 (1995).

"Management Framework for Open Systems Interconnection (OSI) for CCITT Applications," ITU–T Recommendation X.700/ ISO/IEC 7498 (1992).

(List continued on next page.)

Primary Examiner—Viet D. Vu
(74) Attorney, Agent, or Firm—Justin Boyce; Felix L. Fischer

(57) ABSTRACT

A process of providing operation oriented common signaling information services supports a plurality of different types of network distributed signaling functions in a network. The process includes the steps of: instantiating a class of network objects in a plurality of network entities forming a community, each of the network entities in the community having at least one of the network objects of the class, the class of network objects for modeling a corresponding one of the network distributed signaling functions; and providing a transparent operation oriented interface between the network objects of the network entities of the community, the operation oriented interface enabling interoperations between the network objects. At least one of the network objects is associated with a corresponding managed object that is mapped to the corresponding network object by public attributes of the corresponding network object. Each of the network objects includes external methods for accessing managed objects associated with other ones of the network objects via the transparent operation oriented interface. The external methods perform network operations, and are operative to invoke the performance of network operations by other ones of the network objects in the community.

47 Claims, 9 Drawing Sheets

OTHER PUBLICATIONS

"*Information Technology—Open Systems Interconnections—Systems Management Overview*," ITU–T Recommendation X.701 / ISO/IEC 10040 (1992).

"*Information Technology—Open Distributed Processing—Reference Model: Foundations*," ITU–T Recommendation X.902 / ISO/IEC 10746–2 (1995).

"*Information Technology—Open Distributed Processing—Reference Model: Architecture* ," ITU–T Recommendation X.903 / ISO/IEC 10746–3 (1995).

"*Introduction to CCITT Signaling System No. 7,*" ITU–T Recommendation Q.700 (1993).

"*Usage of Cause and Location in the Digital Subscriber Signaling system No. 1 and the Signaling System No. 7 ISDN User Part,*" ITU–T Recommendation Q.850 (1993).

"*A Simple Network Management Protocol (SNMP),*" STD15, IETF Network Working Group (1990).

"*Structure and Identification of Management Information for TCP/IP–based Internets,*" STD16, IETF Network Working Group (1990).

"*Management Information Base for Network Management of TCP/IP–based Internets: MIB$_{II}$,*" STD17, IETF Network Working Group (1991).

"*Introduction to Version 3 of the Internet–Standard Network Management Framework,*" RFC 2570, IETF Network Working Group (1999).

Current Signaling System Used in the Switches of Telecommunication Networks in Common Signaling System No. 7 (SS&). The specifications of the SS7 are published by ITU–T Recommendations Q.700–Q.849. (1997).

The Digital Subscriber Signaling System No. 1 (DSS 1) is also a specification of ITU–T. DSS 1 is offered by the ITU–T Recommendation Q.850–Q.999. (1997).

The H.323 signaling system used on IP–based networks for end–to–end controls of multimedia communication is specified by the ITU–T. The subscriber signaling functions are derived from DSS 1. The signaling system is specified by ITU–T Recommendations H.323, H.245 and H.225.0. (2002).

The signaling system used in IP–based networks for session establishment and QoS control on network layer is Resource reSerVation Protocol (RSVP) proposed by IETF. RSVP is published by IETF in RFC 2205. (1997).

The signaling system used for session initiation in multimedia services in IP–based network is Session Initiation Protocol (SIP) defined by IETF. The protocol is described by IETF RFC 2543. (1999).

* cited by examiner

SYSTEM AND NETWORK INTEROPERATIONS USING A MIB-BASED OBJECT-ORIENTED SIGNALING PROTOCOL

BACKGROUND OF THE INVENTION

1. Field of the Invention

The present invention relates generally to control functions in each network layer of a complex multimedia network, and more specifically to a simplified signaling protocol supporting network distributed control functions.

2. Description of the Prior Art

In a complex multimedia network, a wide range of control issues arise in each of the network layers ranging from the physical layer to the application layer. Therefore, multimedia networks require distributed control functions to be implemented between network entities. Control issues in a telecommunication network arise in the physical layer, data link layer, network layer, session layer, and application layer. Distributed control issues typically include call processing, resource allocation, capacity exchanging, routing, dynamic configuration, protection, and restoration.

A signaling channel may be established either inside or outside of a network in order to provide for the exchange of messages for control and management purposes. The signaling channel may be supported by a transmission protocol in any network layer if the protocol provides a point-to-point channel between control protocol entities across mediated nodes. A physical layer transmission protocol supports only message exchanges between physical nodes. A data link layer transmission protocol provides a channel between adjacent switches. Transmission protocols implemented over the network layer provide signaling channels between switches and between end-points.

The network layer provides a transparent means for transmitting data from a calling party to a called party. Data transmission methods used in telecommunication networks generally include connection oriented transmission methods and connectionless oriented transmission methods. In connection oriented networks (e.g., STM, ATM, SDH, or PDH), the calling party must first establish a path to a called party and reserve resources along the path before transmitting user data, and then release the path and associated resources after the transmission is terminated. In connectionless oriented networks, a special protocol is provided in the network layer (e.g., Internet Protocol (IP)). This protocol makes the network layer completely world-wide transparent. In connectionless oriented networks, a calling party delivers packages containing the address of the called party and corresponding data establishing a connection. The Internet Protocol has been used in both the Internet and Intranet. A variety of new multi-media services have been provided based on the IP infrastructure.

Therefore, transmission of user data may be supported by either a connection-oriented network or a connectionless oriented network. Likewise, a carrier of signaling messages may be supported by either a connection-oriented network or a connectionless oriented network. A signaling channel in a connection-oriented network requires the support of a protocol for establishing the signaling channel for exchanging messages. A signaling channel in an IP connectionless oriented network typically requires only the support of User Datagram Protocol (UDP).

A complex multimedia network generally includes a signaling system for carrying control messages associated with distributed control functions between protocol entities within the network. A signaling system typically supports control functions including: establishing and releasing connections; transmitting and receiving the status of endpoints and connections; testing connections; and performing remote control functions.

Conventional signaling systems include: Signaling System No. 7 (SS7) which is a signaling protocol widely used to provide message exchange between switches in telecommunication networks; digital subscriber signaling system No. 1 (DSS 1) which is a signaling protocol used in the User-Network Interface (UNI); Resource Reservation Protocol (RSVP) which is an Internet Protocol (IP) network layer signaling protocol used for session control; and session initiation protocol (SIP) which provides for end-to-end control in IP networks. Also, communication between management stations and managed networks in management protocols such as in (CMIP) common management information protocol (see ITU-T recommendation X.711), and simple network management protocol (SNMP) may be considered to be types of signaling protocols.

Typically, most switches in telecommunication networks are signaled in accordance with Common Signaling System No. 7 (SS7). User-network interface (UNI) of ISDN networks supports DSS 1. IP networks use RSVP to support QoS guaranteed multimedia services. The IP telephony and teleconference adopts the H.323 signaling function. Web-based multimedia communication on IP networks uses SIP for ordering and customizing enhanced services on the basis of HTTP services.

One common signaling system used in switches of telecommunication networks is the Common Signaling System No. 7 (SS7). The specifications of the SS7 are published by ITU-T recommendations Q.700-Q.849. The Digital Subscriber Signaling System No. 1 (DSS 1) is also a specification of ITU-T. DSS 1 is offered by the ITU-T recommendation Q.850-Q.999.

The H.323 signaling system used on IP-based networks for end-to-end controls of multimedia communication is specified by the ITU-T. Subscriber signaling fluctions in the H.323 signaling system are derived from DSS 1. The H.323 signaling system is specified by ITU-T Recommendations H.323, H.245 and H.225.0.

A signaling system used in IP-based networks for session establishment and QoS control in the network layer is Resource reSerVation Protocol (RSVP) proposed by IETF. RSVP is published by IETF in RFC 2205.

A signaling system used for session initiation in multimedia services in IP-based network is Session Initiation Protocol (SIP) defined by IETF. The protocol is described by IETF RFC 2543.

In prior art signaling protocols, network control functions are typically implemented in accordance with function-oriented methods wherein each network control function is divided into several functional components. Control information, such as control messages for implementing each of a corresponding plurality of network control functions, is typically specified in terms of the corresponding function. In a typical prior art function-oriented signaling system supporting interoperations between functional components, a protocol must be specified for each control issue. A protocol is usually specified by components including: a collection of designated primitives and parameters associated with interfaces between protocol users and protocol entities; a set of messages transmitted between protocol entities; and a set of state transition machines and associated message processing within protocol entities. In a typical prior art function-oriented signaling system, each protocol associated with a corresponding control function includes semantic dependent primitives which are uniquely specified for the corresponding control function. As an example, for a control function for establishing a logical channel across a network, "connect" and "disconnect" primitives are used. Because a protocol must be specified for each control issue in a typical prior art function-oriented signaling system, the number of protocols used for communication between network entities may be very large and the maintenance for the system is very difficult and complicated. This problem becomes increasingly more important as required network services increase.

For example, SS7 is designed to provide message exchange for interoperations between specific functional entities distributed in network switches. SS7 provides for establishing a signaling channel within a common signaling channel across switches for conveying messages associated with corresponding network control functions. SS7 has been widely used in single-service networks such as telephone networks. However, the bandwidth of the bearer channel is restricted to 64 KB. SS7 does not provide any mechanism for security and access control. Because interoperations between the applications over the SS7 signaling protocol (control functions) have to be designed by message, the amount of messages and control protocols over SS7 will increase exponentially in multimedia multi-service networks. However, it is difficult to implement additional interoperation and interworking between different control functions since the messages are closely related to the corresponding functional components.

DSS 1 is used for the interface between switches and end-devices. The DSS 1 functions are designed for ISDN services. It is not adequate to be a signaling protocol on IP-based multimedia multi-service networks, since the principle of DSS 1 is to define a set of Information Elements of support to all ISDN services. The messages on the DSS interface are function-oriented. Therefore, it is not possible to extend the control functions supported by the signaling protocol.

H.323 uses the same signaling mechanism as DSS 1 for interfacing with subscribers. The signaling between endpoints (terminals, gateways, and gatekeepers) for control functions is defined on the signaling channel across IP network. H.323 signaling is also a function-oriented signaling system since the messages are defined by functions and the signaling functions are associated by the control functions.

RSVP is used for resource reservation in network layer for a multicast session. The signaling mechanism of RSVP, which has an object oriented approach, provides the ability to spread large kinds of messages along the paths of a session. However, it can be used for control functions in the network layer only. It is not a protocol for end-to-end control. SIP makes use of the HTML protocols to describe the messages between clients and servers for initiating multimedia sessions. Because the servers provide session control functions, the HTML messages are still function-oriented.

Prior art signaling protocols in telecommunication networks are dependent on control functions. Therefore, each control function is defined by a specific collection of primitives, parameters, messages, state-transitions, processing and security mechanisms over message transmission functions. This feature results in a large number of complex control and signaling functions. Since the signaling systems are designed for the networks with the same technology, the interoperations between heterogeneous networks and the interworking between different network layers are difficult to be implemented. In addition, current signaling mechanisms are independent of management signaling protocols such as CMIP and SNMP. When a control needs management information (e.g., call admission needs the information of resources and policies), the interoperations between management systems and control functions are further complicated.

Object-oriented methods provide an alternative to function-oriented methods for system analysis, design, and implementation. In an object model of a system, objects are represented by a set of attributes, methods and restrictions. Objects and interactions between the objects are defined. Details of the objects are encapsulated and invisible to others.

Security is an important issue in signaling systems. Any operation on network entities should be authorized and authenticated while the signaling channel is built on a non-private network. Security mechanisms should be established in network entities for each control function whether the signaling mechanism is function-oriented or message-oriented. Operation-oriented signaling provides protection from illegal operations, and supports access controls for a specific set of objects.

FIG. 1 is a block diagram generally illustrating a community at 10 established in a network in accordance with a conventional function-oriented common signaling system including a first network entity 12 and a second network entity 14. A message channel 16, which is supported by a common signaling system, provides a platform for a plurality of distributed network control functions 18 in the network. The depicted signaling system includes three network distributed control functions 18 designated FUNCTION_A, FUNCTION_B, and FUNCTION_C, each providing distributed functions associated with the first and second network entities. The common signaling system supporting the message channel 16 provides an end-to-end channel, which may be reliable, for transferring control messages between the first and second network entities. For the case wherein the supporting platform is a connection-oriented network, the control channels must be established before the control function is available.

In order to make the distributed control functions available in a function-oriented control and signaling environment, a control protocol invoking user and a control protocol performing user associated with each of the network functions 18 are provided in each of the network entities 12 and 14. Also, an outgoing control protocol entity and an incoming control protocol entity associated with each of the network functions 18 are provided in each of the network entities 12 and 14.

The first network entity 12 includes a control protocol invoking user 20, and an outgoing control protocol entity 22 for each of the network control functions 18. The second network entity 14 includes a control protocol performing user 24, and an incoming control protocol entity 26 for each of the network control functions 18. For example, the first network entity 12 includes CONTROL PROTOCOL_A INVOKING USER, and an OUTGOING CONTROL PROTOCOL_A ENTITY for FUNCTION_A. Also, the second network entity 14 includes a CONTROL PROTOCOL_A PERFORMING USER, and an INCOMING CONTROL PROTOCOL_A ENTITY for FUNCTION_A.

The invoking user 20 and performing user 24 act either as agents of the associated one of the distributed control functions 18, or as clients of the associated one of the outgoing and incoming protocol entities 22 and 26. The invoking user 20 accepts request messages from the corresponding one of the network control functions 18 as illustrated by a line 28, and the performing user 24 of the second network entity 14 executes the requests from the first entity 12. The performing user 24 also receives a response from the corresponding function as illustrated by a line 32, and transmits the response to the protocol invoking user 20 as illustrated by the line 30.

As an example, the CONTROL PROTOCOL_A INVOKING USER and the CONTROL PROTOCOL_A PERFORMING USER are agents of the network control FUNCTION_A, and the CONTROL PROTOCOL_B INVOKING USER and CONTROL PROTOCOL_B PERFORMING USER are agents of FUNCTION_B.

The protocol entities 22 and 26 provide control and signaling services to the protocol users 20 and 24, the services being defined for each corresponding one of the network control functions 18. The implementation of the services is based on function-oriented primitives and parameters communicated between the protocol entities 22 and 26 and the protocol users 20 and 24 as illustrated by lines 40 and 42. Thus, primitives and parameters are also defined for each corresponding one of the network control functions 18. As examples, the A-function-oriented primitives and parameters are specific to FUNCTION_A, the B-function-oriented primitives and parameters are specific to FUNCTION_B, and the C-function-oriented primitives and parameters are specific to FUNCTION_B.

Each of the protocol entities 22 and 26 includes a state transit machine, or, STM, (not shown) for describing the status of the protocol entity. For each of the network control functions 18, there is a specific description for the corresponding one of the outgoing control protocol entities 22, and a specific description for the corresponding one of the incoming control protocol entities 26.

A set of function oriented messages must be defined specifically for each corresponding one of the network control functions 18. These messages are transmitted via the message channel 16 between the protocol entities 22 and 26 as illustrated by lines 44 and 46.

Thus, traditional control and signaling mechanisms are implemented function-by-function. Particular sets of primitives, parameters, state transit machines, and messages must be designated for each specific function. If the network has many distributed control functions, the signaling mechanism becomes very complicated. Therefore, conventional function-oriented common signaling systems are difficult to maintain, difficult to update, and difficult to expand.

Open Distributed Processing (ODP) provides an object-oriented approach to network control. In accordance with ODP, a network control function can be described by an object model comprising a collection of network objects and their interactions. Furthermore, an object model is able to represent many control functions in which the same group of objects is involved. From the perspective of object interoperation, ODP is a remote access method by which an object is able to interoperate with other objects transparently. The interoperations between network objects may be supported by function-oriented, message-oriented, or operation-oriented signaling mechanisms. Function-oriented signaling makes use of designated messages for each function. Using a message-oriented mechanism, all functions share a set of specific messages. In an operation-oriented mechanism, interoperations between objects share a designated set of operations and a collection of managed objects which are the maps of the network objects.

Function-oriented signaling is widely used in network control functions. An example of message-oriented signaling is DSS 1 for call processing. Usually, services provided by the message-oriented signaling are restrained by the shared messages. In the prior art, operation-oriented signaling mechanisms have not been applied to network control functions, but have been applied to network management applications only. Operation-oriented signaling is restricted by the definitions of the operations.

FIG. 2 is a block diagram generally illustrating a conventional function-oriented model at 50 for distributed network control functions, the model including: a first network entity 52 having a corresponding plurality of modules 56; and a second network entity 54 having a corresponding plurality of modules 58. In the function-oriented model, all functions of modules associated with a particular control issue are considered in a control application. For each distributed function, a corresponding pair of modules are provided in the network entities 52 and 54. For example, one of the modules 56 designated FUNCTION_A in the first network entity 52 interoperates with an associated one of the modules 58 designated FUNCTION_A in the second network entity 54.

Interoperations between the associated modules are designed in accordance with function-oriented methods. Each of the modules 56 in the first network entity communicates only with the associated one of the modules 58 in the second network entity as indicated by lines 60. Communication between corresponding ones of the modules includes transmission of primitives, parameters, and messages. In general, in prior art function oriented signaling systems, a specifically designed set of primitives, parameters, and messages must be used for the interoperation between each corresponding pair of modules.

The function-oriented model for network distributed applications is widely used in telecommunication systems. In function-oriented models, the signaling functions are closely related to the semantics of the control functions. For example, this is the case in DSS 1.

In accordance with function-oriented modeling methods, each distributed function requires a unique associated control and signaling protocol. A disadvantage associated with function-oriented modeling methods is that the number of types of protocol entities and the complexity of the protocol entities in the network increases exponentially as the media and services of the network expand.

SUMMARY OF THE INVENTION

It is an object of the present invention to provide a signaling protocol providing a common signaling service layer between message transmission functions and various distributed control and management functions in a complex multimedia network.

It is also an object of the present invention to provide a signaling protocol providing operation-oriented common signaling information services which are associated with corresponding security and access control mechanisms for distributed control and management issues on an IP-based network, wherein the signaling information services are simple, transparent, flexible, scaleable and manageable.

It is a further object of the present invention to provide such a signaling protocol wherein the common signaling information services are semantic-independent so that a variety of applications may be run on the protocol platform, which is used for carrying messages from one point to another, without any specific design of primitives, messages, and security mechanisms.

Another object of the present invention is to provide a signaling protocol which is compatible with simple network management protocol (SNMP) used in IP-based networks so that network control functions can inter-operate with management functions and the control functions are therefore manageable by network administration.

Another object of the present invention is to provide a signaling protocol which may also be used as an interworking platform for various control functions in different network layers, such as protection and restoration.

Another object of the present invention is to provide a simplified signaling mechanism for use in telecommunication networks.

Another object of the present invention is to provide a signaling protocol for network control functions which is consistent with management functions. Briefly, a presently preferred embodiment of the present invention includes a process of providing operation oriented common signaling information services for supporting a plurality of different types of network distributed signaling functions in a network. The process includes the steps of: instantiating a class of network objects in a plurality of network entities forming a community, each of the network entities in the community having at least one of the network objects of the class, the class of network objects for modeling a corresponding one of the network distributed signaling functions; and providing a transparent operation oriented interface between the network objects of the network entities of the community, the operation oriented interface enabling interoperations between the network objects.

At least one of the network objects is associated with a corresponding managed object that is mapped to the corresponding network object by public attributes of the corresponding network object. Each of the network objects includes external methods for accessing managed objects associated with other ones of the network objects via the transparent operation oriented interface. The external methods perform network operations, and are operative to invoke the performance of network operations by other ones of the network objects in the community.

The step of providing a transparent operation oriented interface includes providing an operation oriented semantic independent signaling protocol entity in each of the network entities of the community, the signaling protocol entities for generating signaling protocol messages in response to primitives and associated parameters received from the network objects, a portion of the signaling protocol messages including packaged primitives and associated parameters. The packaged primitives are operation oriented semantic independent primitives which support a plurality of different types of network distributed signaling functions. The step of providing a transparent operation oriented interface also includes transmitting the signaling layer protocol messages between the signaling protocol entities via the network.

The operation oriented semantic independent primitives are used to specify operations to be performed by selected ones of the network objects. The operations include: a get operation for accessing values of managed objects; a Set operation for alternating values of managed objects; a create object operation for creating new managed objects; a delete object operation for deleting managed objects; a notify operation for providing notification messages to remote network objects regarding network management issues; and an event operation for providing event messages to remote network objects regarding network control issues.

The operation oriented semantic independent primitives include generic primitives for indicating a type of operation to be performed by a network object, and specific primitives indicating a behavior of the operation. The generic primitives include get primitives for accessing values of managed objects, set primitives for alternating values of managed objects, create primitives for creating new managed objects, delete primitives for deleting managed objects, event primitives for providing event messages to remote network objects regarding network control issues, and notify primitives for providing notification messages to remote network objects regarding network management issues. The specific primitives include request primitives for requesting performance of a corresponding one of the operations, status primitives for indicating a status of a corresponding process, response primitives for providing a response to a get command, confirmed primitives for indicating execution and receipt of a get command, and indication primitives for indicating a status and error in a corresponding process.

An important advantage of the signaling protocol of the present invention is that it provides transparent visibility and accessibility of network objects in a community.

Another advantage of the signaling system of the present invention is that it provides a fully distributed signaling mechanism because each signaling entity residing in a network entity provides both a server and a client simultaneously in signaling services without master-slave relationship. The connectivity between two signaling entities is supported by UDP/IP protocols.

A further advantage of the signaling system of the present invention is that the signaling protocol provides semantic-independent operation-oriented common signaling information services which are abstracted from the behaviors of the operations between specific network objects. Network objects in any type of control function provide interoperation via semantic independent primitives such as Get and Set, instead of the semantic dependent primitives which are associated with specific control functions.

An additional advantage of the signaling system of the present invention is that it provides a predefined standardized management information base. Managed objects mapped from network objects in a community are defined with control protocols and management protocols while using the MIB-based signaling protocol. Therefore, every signaling entity knows the semantics and syntax of the managed objects.

Yet another advantage of the signaling system is that it provides a common platform for both signaling functions and management functions by providing for integration of signaling functions with the Internet Standard Management Framework.

A further advantage of the signaling system is that it provides an implicit common security mechanism for all control applications over the signaling protocol. The signaling system is also advantageous in that it provides implicit common community-based access control to protect against illegal access by network objects out of the community.

Yet another advantage of the signaling system of the present invention is that it supports session initiation functions for establishing sessions between endpoints before communication begins. The signaling system is also advantageous in that it supports simultaneous interoperation between the network objects residing in different network elements.

An important advantage of the signaling system is that it supports interworking across network layers. A powerful feature of the MIB-based signaling protocol presented in the invention is the signaling protocol is designed for transparent interworking between different network layers either within or without the same network entity. This is different from current layer-based signaling mechanisms such as SS7 and DSS 1. The signaling protocol of the present invention therefore unifies the interworking across layers and between network entities. On behalf of any network object in any network layer, other network objects in different network entities and different network layers are logically visible and accessible as longer the management information bases are well defined and the operations are authorized.

Yet another advantage of the signaling system of the present invention is that it supports interoperation and interworking between heterogeneous networks provided by a variety of vendors. Interoperations between network objects in heterogeneous networks can also be implemented by the signaling protocol if signaling protocol entities are configured in each network entity of the heterogeneous networks. The interworking between the network entities with different technologies (such as IP over ATM supported by SDH) for control and management purposes are greatly simplified. Since the mapping from network object to managed object is the business of the manufacturers of network entities, the interoperations between the network entities from different venders are easy to implement by the signaling protocol.

Another important advantage of the signaling system of the present invention is that it supports signaling functions in any network. The carrier of the signaling protocol in the preferred embodiment of the present invention is UDP/IP. However, the network control and management applications over the signaling protocol may be implemented in any network. Therefore, most signaling protocols in current telecommunication networks can be substituted by the MIB-based signaling protocol of the present invention if a UDP/IP network connects all network entities of signaled networks. In the scheme, the UDP/IP network acts as a signaling network for all telecommunication networks. From the experience of the Internet, the signaling network, the common UDP/IP-based signaling network supporting the signaling protocol in the invention provides advantages in cost, efficiency and reliability.

The foregoing and other objects, features, and advantages of the present invention will be apparent from the following detailed description of the preferred embodiment which makes reference to the several figures of the drawing.

IN THE DRAWINGS

Figure 4:
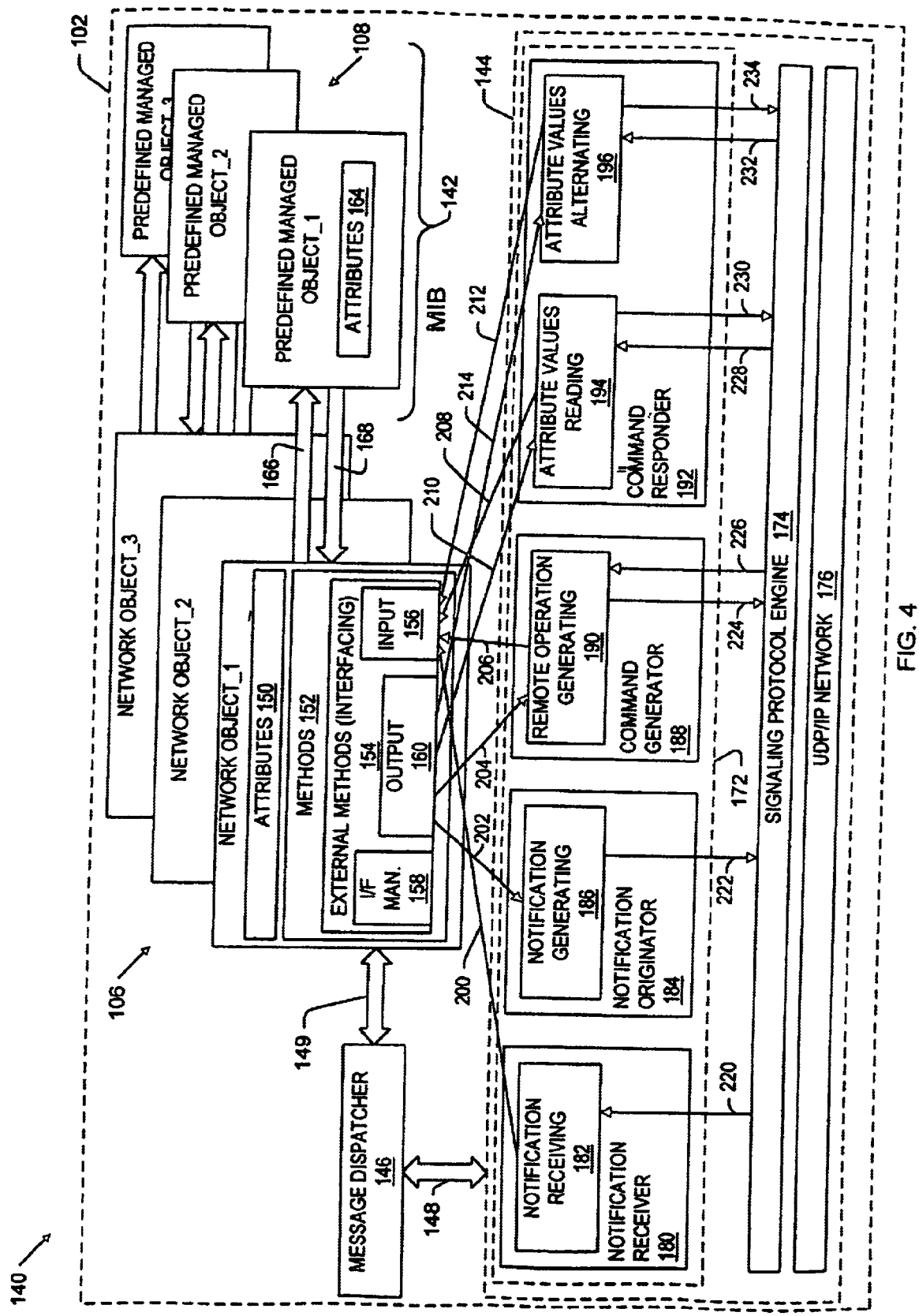
Figure 5:
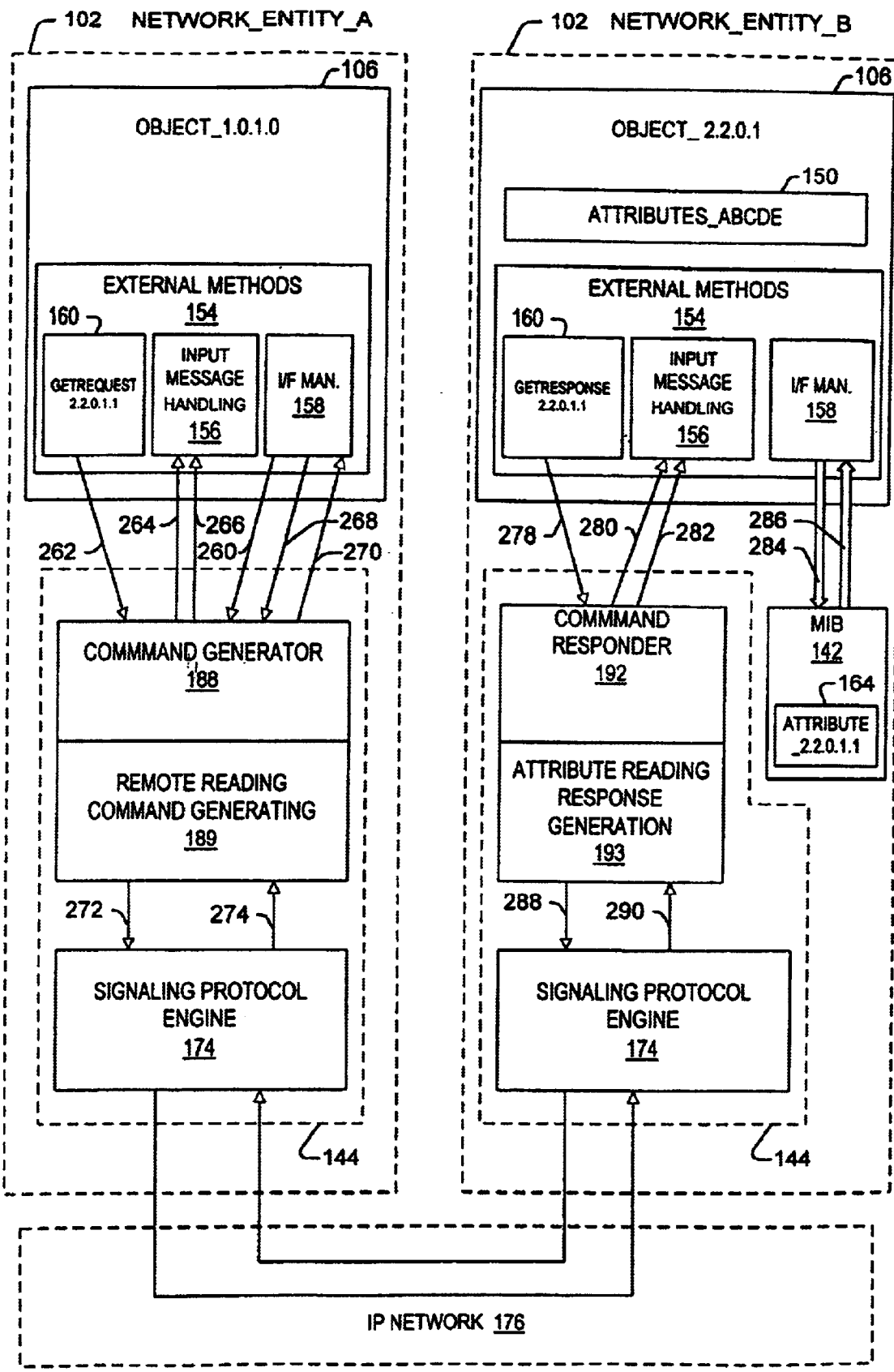
Figure 6:
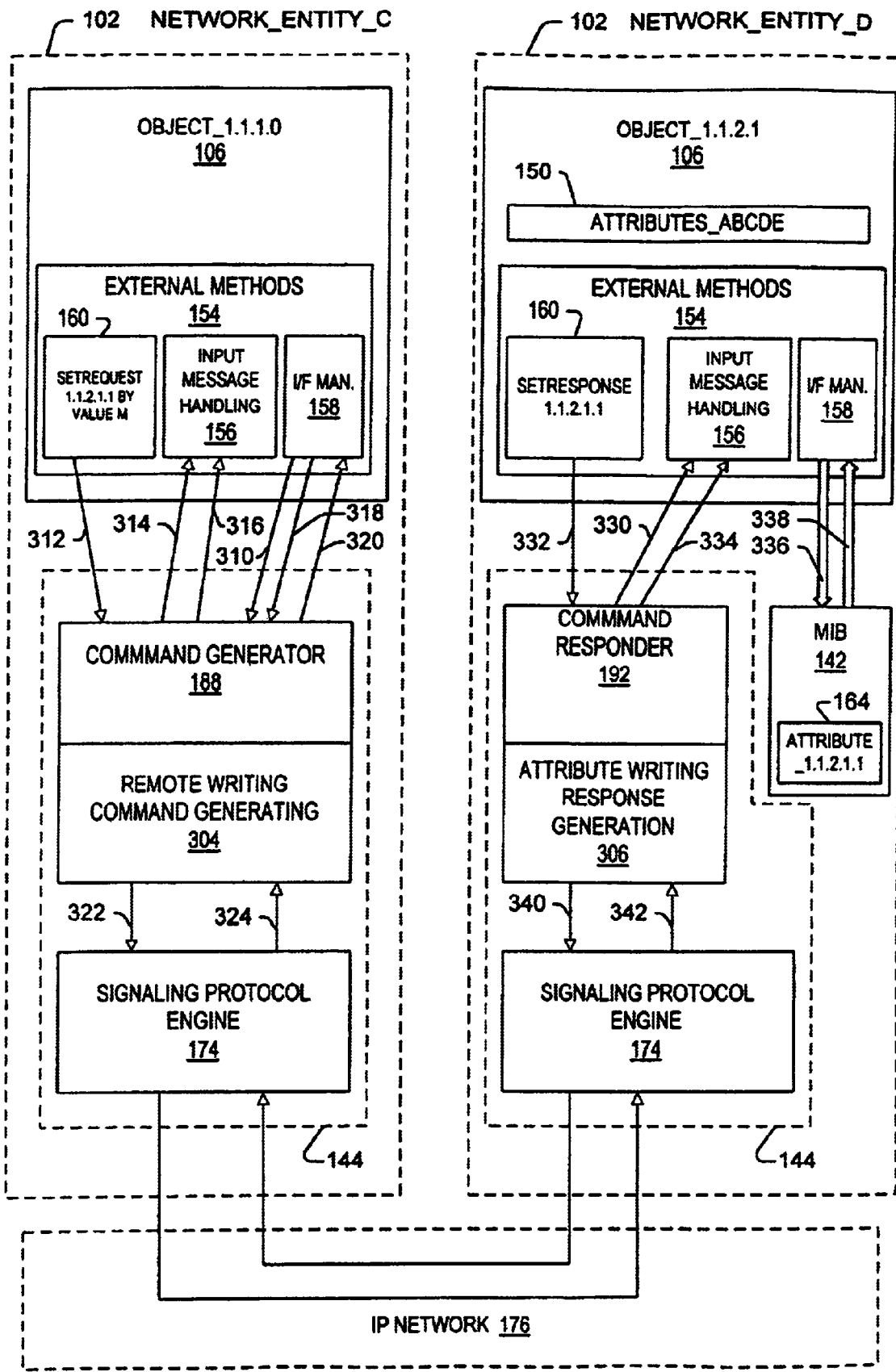
Figure 7:
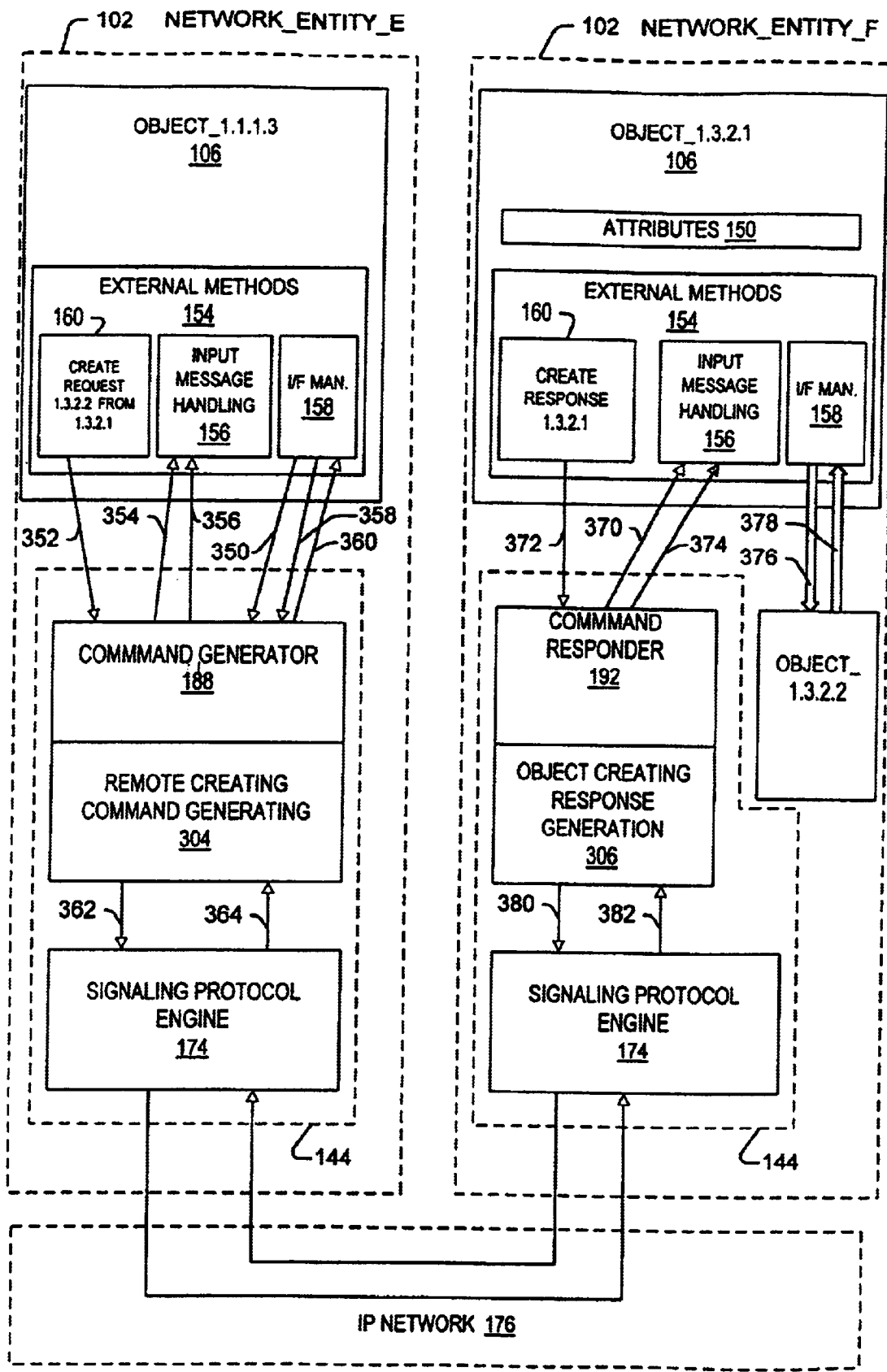
Figure 8:
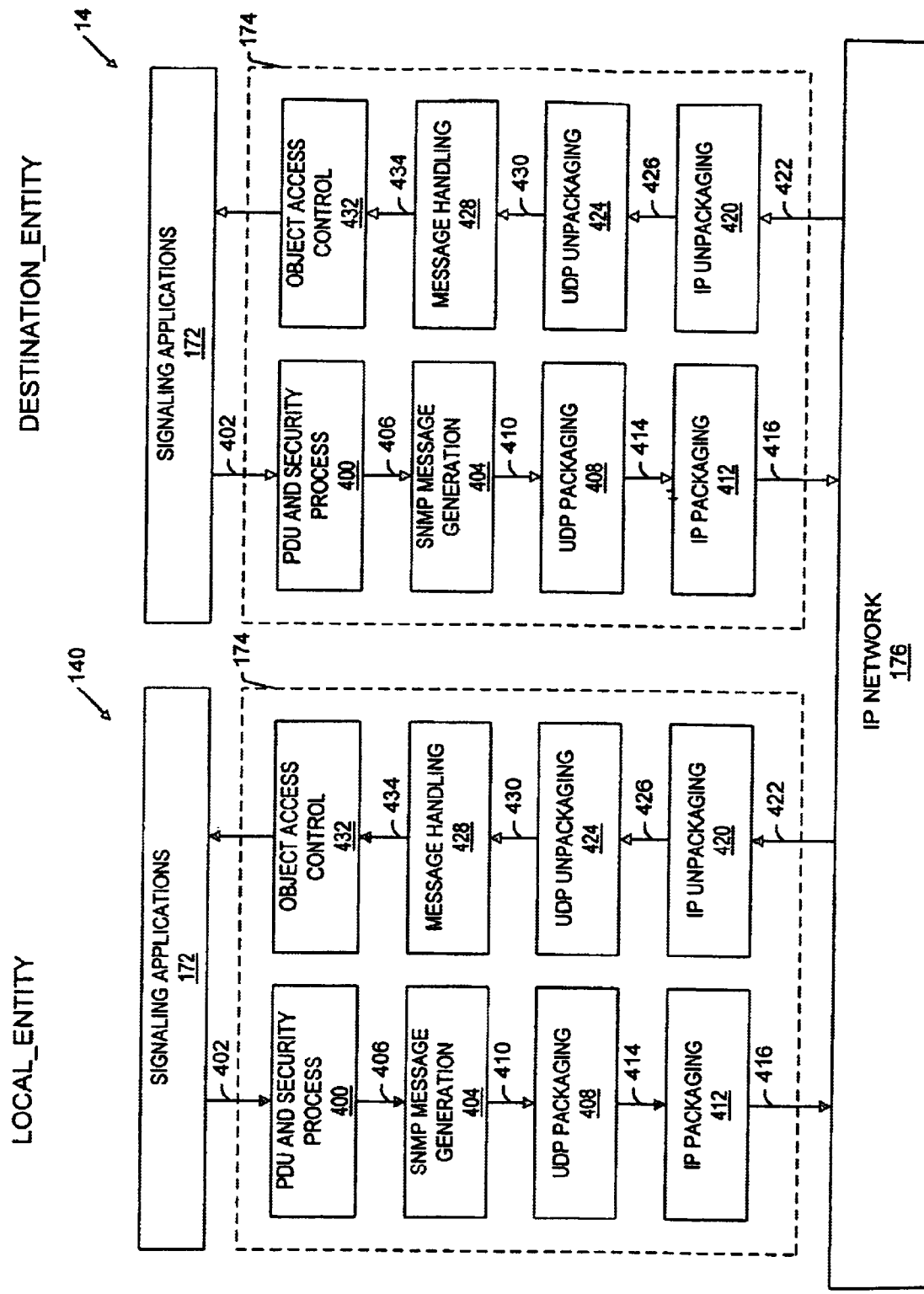

FIG. 4 is a block diagram illustrating a network entity configured in accordance with the MIB-based object-oriented signaling protocol of the present invention, the network entity including: network objects; managed objects; and a local signaling protocol entity having a plurality of signaling applications providing common signaling information services, and a signaling protocol engine for conveying commands and notifications between different ones of the network entities;

FIG. 5 is a block diagram generally illustrating components providing for execution of a Get request remote operation in the control and signaling system of the present invention;

FIG. 6 is a block diagram generally illustrating components providing for execution of a Set remote operation in the control and signaling system of the present invention;

FIG. 7 is a block diagram generally illustrating components providing for execution of a Create operation in the control and signaling system of the present invention; and FIG. 8 is a block diagram generally illustrating message and protocol data unit (PDU) processing in the signaling protocol engine of FIG. 4.

DETAILED DESCRIPTION OF THE PREFERRED EMBODIMENTS

Distributed network control functions, such as network processing procedures and resource allocation functions, provide important roles in modern multimedia multi-service networks, especially in emerging "voice over IP applications". Distributed network control functions require a common, simple, flexible, scaleable, and manageable signaling protocol for conveying messages for implementing various network control functions.

A management information based signaling protocol (MIB-based signaling protocol) in accordance with the present invention uses an object-oriented approach to model network control and management functions in an object model, and uses an operation-oriented message exchange mechanism to support interoperations between the network objects. Any network object in any network layer can be controlled via the signaling protocol of the present invention, provided that a collection of appropriate managed objects is well defined. In varying embodiments of the present invention, the MIB-based signaling protocol and associated modeling methods are used in Gateways, Gatekeepers for voice over IP call processing, and end-to-end multimedia session control functions.

The purpose of the object modeling in the present invention is to identify network objects, relationships, and associated managed objects within a community for which the present signaling protocol provides semantic-independent and operation-oriented signaling services for the interoperations between the network objects. Physical and logical components associated with the network distributed control functions within a community are modeled by network objects within network entities. The network objects related to a specific control issue are considered in a community.

Figure 1:
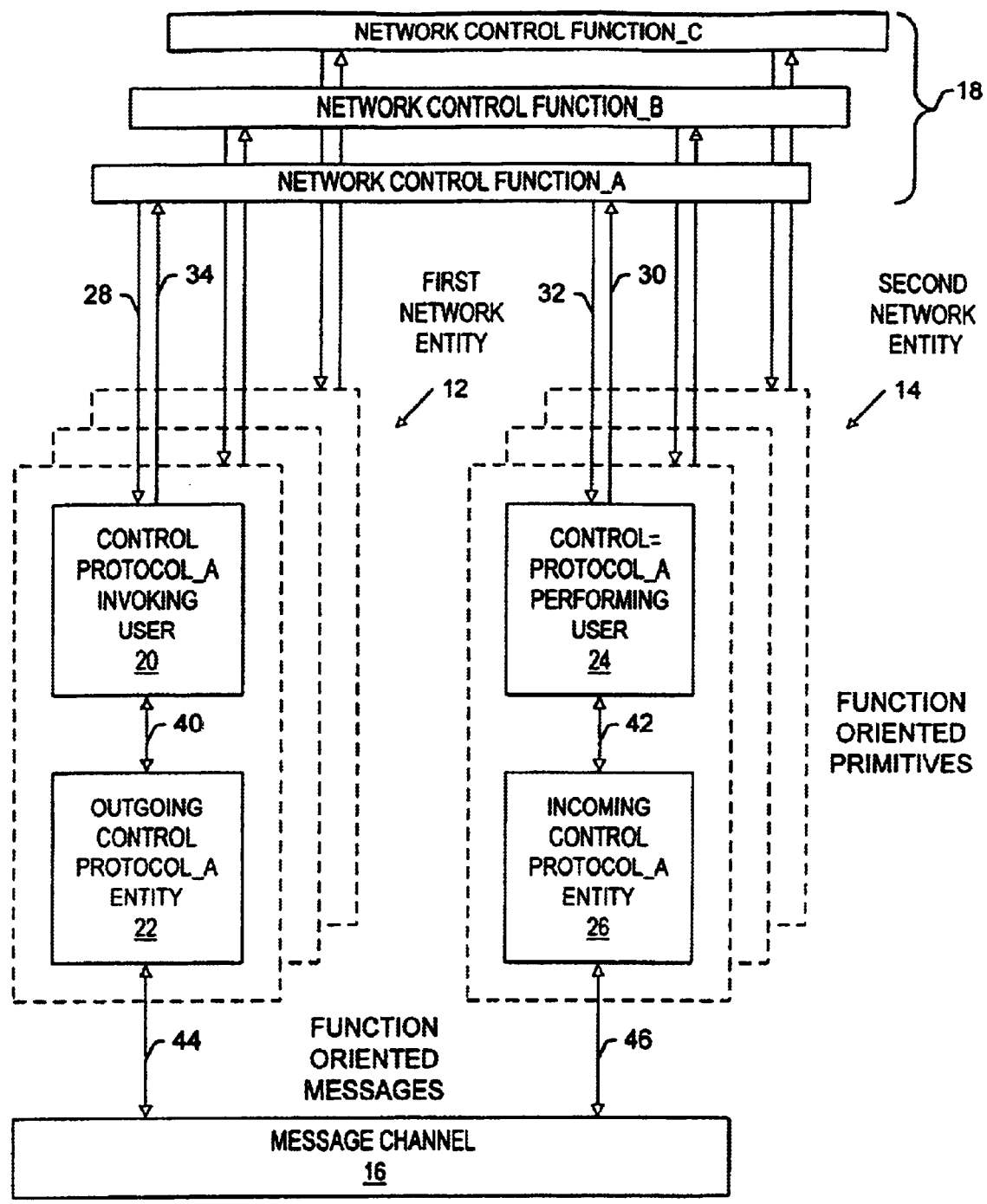
FIG. 1 is a block diagram generally illustrating a conventional function-oriented control and signaling system including a pair of network entities forming a community.
Figure 2:
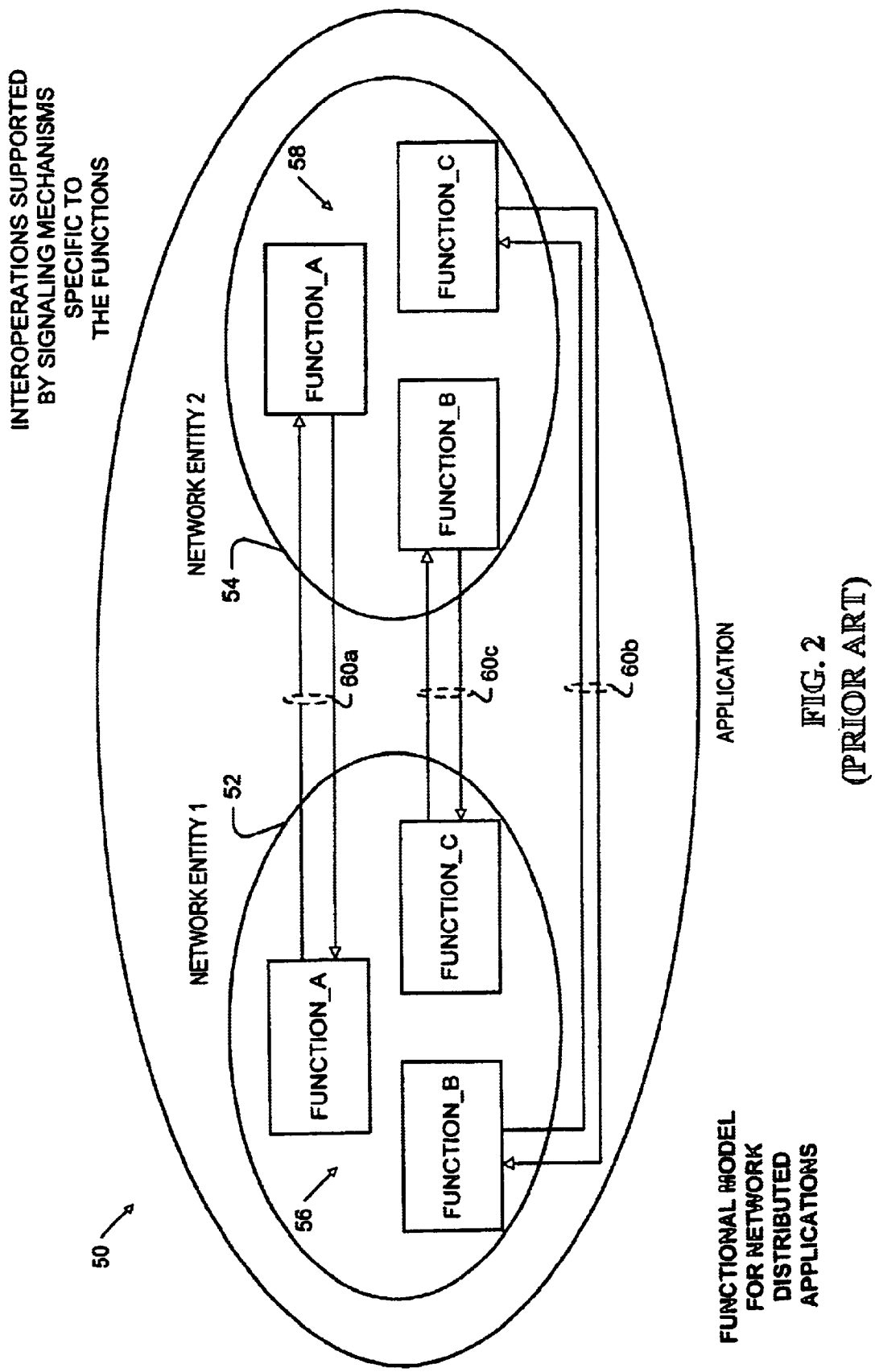
FIG. 2 is a block diagram generally illustrating a conventional function-oriented model for distributed network control functions.
Figure 3A:
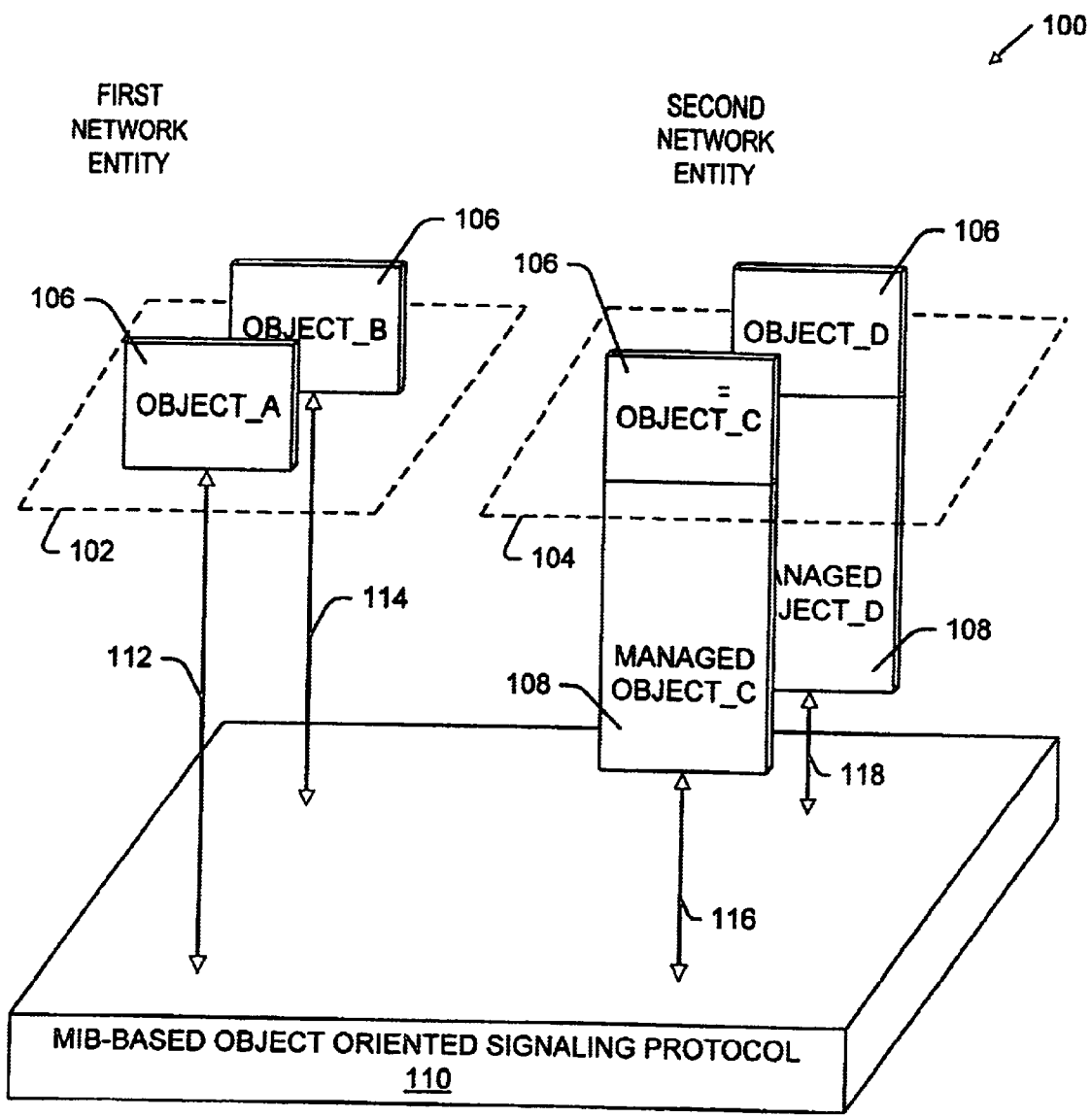
FIG. 3A is a block diagram generally illustrating an architecture of a management information based (MIB-based) object-oriented control and signaling system in accordance with the present invention.

FIG. 3A shows a block diagram generally illustrating an architecture of a management information based (MIB-based) object-oriented control and signaling system at 100 in accordance with the present invention. The signaling system 100 supports network distributed control functions for a plurality of network entities forming a community. Examples of a network entity include end-devices, switches, routers, gateways, and gatekeepers. In the depicted system, a community is established between a first network entity 102 and a second network entity 104 as further explained below. Network functions in the signaling system 100 are modeled by a plurality of network objects 106, and by interoperations between associated ones of the network objects. The signaling system 100 may be implemented in any type of telecommunication system including a telephone network, an integrated services digital network (ISDN), a private internet, and the public Internet.

In the depicted system, two of the objects 106 designated OBJECT_A and OBJECT_B, are provided in the first network entity 102, and two of the objects 106 designated OBJECT_C, and OBJECT_D are provided in the second network entity 104. The signaling system of the present invention supports simultaneous interoperation between different network objects 106 residing in different ones of the network entities 102, 104. The MIB based objected oriented signaling protocol of the present invention provides a common mediation for the network objects 106 in various network control and management applications simultaneously. Different interoperations of applications in different network layers may coexist in a plurality of signaling mechanisms. In a preferred embodiment, the signaling protocol is supported by the Internet Protocol (IP). However, the signaling protocol can be supported by any type of protocol in any type of network.

Each of the network objects 106 has associated attributes and methods. Some of the attributes are public and some are private. Public attributes of a network object represent a subset, a view, or a map of the attributes of the object that are accessible to other network objects. Public attributes are referred to as managed objects of the network object. Each network object has external methods for manipulating managed objects associated with other ones of the network objects in the local network entity or in remote network entities via the signaling protocol transparently. Therefore, any network object is transparently visible and accessible to other ones of the network objects if the associated managed objects are well defined.

Control functions having multiple process steps may be modeled by signaling objects representing control protocol entities. For example, the Capacity Exchange Procedure in H.245 has an incoming protocol entity and an outgoing protocol entity. These protocol entities, which may reside within end users or gatekeepers, must be modeled by network signaling objects having internal message handling. The structure of the control protocol entity is an issue outside the network signaling protocol. However, all attributes and status's of the signaling objects visible to other network objects are mapped to managed objects.

As further explained below, each of the network objects 106 which is accessible to other network objects is associated with one of a plurality of managed objects 108. In the depicted example, it is assumed that OBJECT_A and OBJECT_B are invoking objects, while OBJECT_C and OBJECT_D are performing objects. Thus, OBJECT_C and OBJECT_D are mapped and identified by corresponding ones of the managed objects 108 designated MANAGED_OBJECT_C and MANAGED_OBJECT_D respectively.

Logically, the managed objects are stored in a Management Information Base (MIB) which is a collection of attributes of the managed objects within the network as further explained below. Each of the managed objects 108 may be a variable, a set of variables of the same type, or any structure composed of a simple data type. In order to be compatible with standard IP-based network management protocols, the structure of the MIB used in the signaling protocol is derived from the Structure of Management Information (SMI) of the Simple Network Management Protocol (SNMP).

A platform for the objects 106 is provided by an MIB-based object-oriented signaling protocol illustrated at 110. The signaling protocol 110 provides common signaling information services (CSIS) to the network objects 106 for their interoperations. Operation oriented primitives of the protocol 110 are communicated between the objects 106 via the protocol 110 as illustrated by lines 112, 114, 116, and 118. The Primitives are used to implement Get, Set, Create, Delete, Notify, and Event operations as further explained below. As mentioned, each of the objects 106 provides a model for a corresponding network function in a corresponding entity. In accordance with the present invention, any distributed function can be implemented by the MIB-based Object-oriented signaling protocol 110 if it is modeled by appropriate objects and interoperations. For example, a call processing of a telephone service on an IP network involves a calling party, a called party, and two gatekeepers. These may be modeled by two objects named 'end user', and two objects named 'basic call processing' in a community named 'telephone service'. Call processing is implemented by interactions between the objects in the telephone service community. As an example, OBJECT_A of the first network entity provides a model for a calling party, and OBJECT_C of the second network entity provides a model for a called party. Call processing of telephone service on IP networks requires that the calling party send several messages to the called party to execute functions. For example, to make the telephone set of a called party ring, a Set primitive is used by the calling party to set a "ring attribute" of the called party to "one" in order to ring the called party. Likewise, a Set primitive maybe used by the calling party, OBJECT_A, to set a "ring attribute" of the called party, OBJECT_B, to "zero" in order to stop ringing the called party.

In prior art signaling systems, signaling functions used for call processing include a function for establishing a connection (e.g., a dialing function). A ringing function, and a protocol function must be designed for each function. In the present invention it is not necessary to create or program specific messages for implementing specific functions between corresponding entities. The primitives transmitted between the objects are semantic independent primitives. In accordance with the present invention, the semantic independent primitives may be used to implement a wide variety of functions. The primitives comprise services provided by the MIB-based object oriented signaling protocol.

As further explained below, each of the network objects 106 includes internal methods and external methods. The external methods use the common signaling information services of the signaling protocol 110 for accessing other ones of the objects 106.

In a preferred embodiment of the present invention, the signaling system 100 runs on an IP-based network under the support of UDP/IP as further explained below. Security and access controls are provided by the signaling protocol if necessary. The signaling for network controls and the signaling for network management based on SNMP are integrated by the signaling protocol of the present invention.

Network entities containing managed objects are addressed by IP addressing. The managed objects 106 are named in an ISO tree. In one embodiment of the present invention, the signaling protocol 110 makes use of the same naming method as the simple network management protocol (SNMP). Also, in an embodiment, the managed objects for control purposes are under the sub-tree: iso (1).org (3).dod (6).internet (1).private (4).enterprises (1).wacos (2702).

The system and method for network interoperations using a MIB-based signaling protocol in accordance with the present invention provides a simplified structure for the implementation of distributed network functions. This simplified structure reduces complexity, and increases maintainability, reliability, and flexibility in the development of network control and management functions.

Figure 3B:
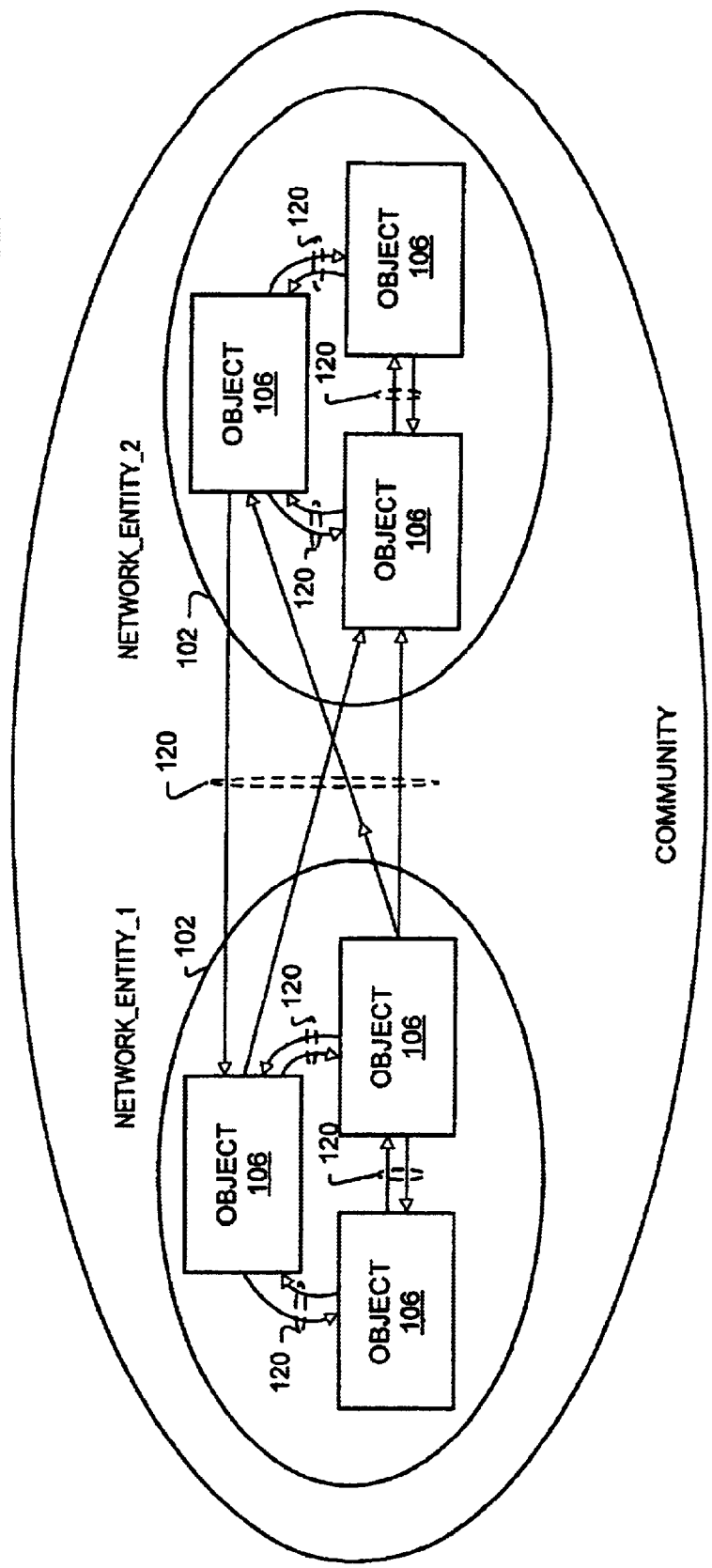
FIG. 3B is a block diagram generally illustrating an object-oriented model for distributed network control functions in accordance with the present invention.

FIG. 3B shows a block diagram generally illustrating a pair of network entities 102, 104 designated NETWORK_ENTITY_1 and NETWORK_ENTITY_2 forming a community in the MIB-based object-oriented control and signaling system 100 (FIG. 3A) in accordance with the present invention. In object-oriented modeling, distributed network control issues are considered in a community including different network entities 102, 104 each having network objects 106. Network control functions involved in the network objects are represented by the network objects 106 and their interoperations. Thus a community may cover many network control functions as long as they are subject to the set of objects or the subset of the objects in the community.

As further explained below, each of the network objects 106 is described by its attributes, methods, and interaction interface. These attributes and methods are hidden to other ones of the network objects. As further explained below, only external attributes and methods of the network objects 106 are accessible. Each of the network objects 106 can access any other one of the network objects 106 in a community, as illustrated by lines 120 drawn between the objects. As further explained below, in order to allow access to other network objects, each network object has an associated managed object (not shown) which provides a map of the network object. The managed objects are logical concepts providing for object interoperation. In the preferred embodiment, the mapping of a network object is implemented by external methods of the network object.

The object-oriented model requires the support of transparent interoperations between network objects. The transparent interoperations are implemented by the MIB-based signaling protocol 100 (FIG. 3A). As further explained below, this signaling protocol provides a set of operation-oriented semantic-independent common signaling information services to the network objects 106 where the signaling protocol entity is installed in each network entity on a network. As a result, control functions can be extended easily in terms of adding new interoperations between the network objects in the community. No additional protocols are necessary for the extension.

FIG. 4 illustrates a block diagram of a network entity at 140, the depicted network entity being configured in accordance with the system and method for network interoperations using the MIB-based object-oriented signaling protocol of the present invention. The network entity 140 includes: a plurality of the network objects 106; a Management Information Base (MIB) 142 which is a logical entity representing the knowledge of the network objects, the MIB 142 comprising the managed objects 108 which are logical entities providing maps of associated ones of the network objects 106 for the purpose of providing access to the associated network object by other ones of the network objects; a signaling protocol entity 144 for implementing interoperations between corresponding ones of the network objects 106 within different ones of the network entities 102 (FIG. 3A); and a message dispatcher 146 operative to send and receive messages between selected one of the network objects 106 and the signaling protocol entity 144 as indicated by lines 148 and 149.

The network objects 106 are subject to network control functions. Each of the network objects is operative to invoke the performance of network operations by another one of the network objects. Each of the network objects is also operative to perform network operations in response to invocations by other ones of the network objects. In the depicted example, the network entity 140 includes three of the network objects 106 designated OBJECT_1, OBJECT_2, and OBJECT_3; and three associated managed objects 106 designated MANAGED_OBJECT_1, MANAGED_OBJECT_2, and MANAGED_OBJECT_3 providing maps of OBJECT_1, OBJECT_2, and OBJECT_3 respectively. Each of the network objects 106 may "refer to" the corresponding one of the managed objects 108 as indicated by a line 166. Each of the managed objects 108 is mapped from the corresponding one of the network objects 106 as indicated by a line 168. Each of the network objects 106 is transparently visible and accessible to other ones of the network objects 106 if the corresponding managed objects 108 are well defined.

Each of the network objects 106 includes attributes 150, and methods 152 including external methods 154 for manipulating managed objects 108 via the signaling protocol transparently as further explained below. The external methods 154 include an input message handling method 156, an interface management method 158, and an output method 160. Interoperations between corresponding ones of the network objects 106 may be implemented in accordance with either direct interoperation or indirect interoperation. Direct interoperation is used for implementing interoperations between network objects 106 residing in the same network entity only. Indirect interoperation by the signaling protocol is used for implementing interoperations between corresponding ones of the network objects 106 residing in either the same network entity 140 or different ones of the network entities 102 (FIG. 3A).

The management information base 142 is predefined and standardized. The managed objects 108 mapped from the network objects in a community are defined with control protocols and management protocols while using the MIB-based signaling protocol. Therefore, every signaling protocol entity 144 is configured to communicate in accordance with the semantics and syntax of the managed objects 108. Managed objects 108 in either control applications or management applications are named on the same ISO tree, and follow the same notation, structure and syntax defined in network management standards defined by ISO and IETF.

Each of the managed objects 108 includes a corresponding set of attributes 164. The structure, syntax, and semantics of each type of the managed objects 108 are predefined. The attributes 164 of a managed object may be non-accessible, read-only, or read/write from the point of view of different ones of the network objects that may invoke the operations of the managed object, depending on the authority granted to the accessing object. When a first one of the network objects 106 receives a command for reading an attribute of a managed object associated with a second one of the network objects, the first network object must determine the map between the second network object and its associated managed object. That is, when a network object invokes an operation on another network object, the invoking object must know the structure of the managed object associated with the remote network object. It is noted that some attributes of the managed objects are one-to-one maps of the network object attributes, and some attributes of the managed objects have a one-to-many relationship. The attributes of the managed objects having a one-to-many relationship are read-only. The attributes of a managed object may refer to an attribute of a network object. This is a one-to-one relationship. In this case, the attribute of the managed object is read-write. If the attribute of a managed object is related to more than one attribute of network objects (e.g., an attribute of a managed object is the sum of three attributes of three network objects), the relationship between the managed object and the network objects is one-to-many. Therefore, the SUM attribute cannot support a write operation, or, it is read-only.

The signaling protocol entity 144 is used for implementing interoperations between corresponding ones of the network objects 106 within different network entities 102 (FIG. 3A). The signaling protocol entity 144 provides common signaling information services which are bi-directional. The services are provided to network objects 106 only. Using the bi-directional services, a first network object 106 may operate on a second network object 106 (e.g., Object_A may operate Object_C), and the second network object may also operate on the first network object (e.g., Object_C can also operate Object_A).

Primitives of the common signaling information services may be invoked by a protocol user, which is a network object, or by the signaling protocol entity 144. Each primitive includes a generic primitive and a specific primitive. Generic primitives used in the signaling protocol indicate a type of operation such as Create, Delete, Get, Set, Event, Notify, and Proxy. Specific primitives are used to indicate the behavior of the operation, and include request, status, response, confirmed, and indication. As examples: get.request in a Get command delivered by a protocol user; Get.status indicates a request for the status of a process; Get.response represents a response to a Get command previously delivered; Get.confirmed indicates that the delivered Get command has been received and executed by the protocol; Get.indication signals a status and error, if applicable, in the process. A command specifies a remote operation. Primitives may be associated with a command. Primitives are used to present the services provided by a protocol.

Message flows are defined between protocol entities. Parameters are used as objects of the operation indicated by the primitive. A message is comprised of a primitive and an associated set of parameters. Parameters provide binding of managed objects. A primitive is the subject of an operation, and parameters are the objects of the operation. When a message, including a primitive and parameters, is sent to the signaling protocol entity 144, the parameters indicate specified ones of the remote managed objects 108 specified by the local network object sending the message. When a message is sent to a local network object, the parameters contain responses from remote network objects.

An advantage of the signaling system of the present invention is that it provides a common platform for both signaling functions and management functions by providing for integration of signaling functions with the Internet Standard Management Framework which is a commonly used protocol for network management on IP-based networks. This framework defines the architecture of SNMP including a data definition language (SMI), a definition of management information (MIB), a protocol definition, and security and administration functions. The MIB-based signaling protocol of the present invention is compatible with the framework of SNMP. Not only can the signaling protocol entities 144 within the network entities 102 be used for object interoperations in control applications, but also they can also provide agent functions for network management purposes. Consequently, the signaling protocol of the present invention provides a common platform for both signaling functions and management functions, thereby simplifying the design and implementation of some network signaling functions such as call processing, session access control, and resource allocation, as well as protection and restoration.

As indicated in FIG. 4, the signaling protocol entity 144 includes a plurality of layers including signaling applications 172, a signaling protocol engine 174, and a User Datagram Protocol (UDP) over Internet Protocol (IP) network 176 (UDP/IP network 176). Signaling messages are transmitted between the network entities 102 (FIG. 3A) by the UDP/IP network 176 which provides a carrier for the signaling protocol.

The signaling protocol engine 174 comprises functional components (not shown) including a PDU layer, a message layer, a transport mapping layer, and UDP/IP protocols, as well as security and access control mechanisms. These layers are derived and expanded from open distributed processing (ODP) methodology and the SNMP v3 architecture.

The signaling applications 172 provide a functional interface between corresponding ones of the network objects 106 and the signaling protocol engine 174. An interface supporting interworking between the signaling protocol entity 144 and the network objects 106 provides bi-directional communication between the signaling protocol entity 144 and the network objects 106. Interworking provides for indicating the interoperation between network objects in different network layers in the same network entity. Interoperation usually represents the operation between network objects. This concept is widely used in the documents of IETF (e.g., IP over ATM and RSVP). The functional provided by the signaling applications interface includes the external methods 154 of the network objects and the managed objects 108. The external methods 154 of the network objects provide commands to the signaling protocol entity 144. The external methods 154 call procedures provided by signaling applications within the signaling protocol entity 144 in order to use corresponding ones of the common signaling information services as further explained below. The managed objects 108 provide parameters when the procedures are called.

The input message handling method 156 provides for receiving network application layer protocol messages, which are logical concepts, from other network objects via the signaling protocol entity 144. The interface management methods 158 manage connections between the network objects 106 and the signaling applications 172 of the signaling protocol entity 144 which accept commands from the network objects, and send responses to the network objects. The signaling applications 172 provide interfaces between the signaling engine 174 and the network objects 106.

The signaling applications 172 include: a notification receiver application 180 having a notification receiving function module 182; a notification originator application 184 having a notification generating function module 186; a command generator application 188 having a remote operation generating function module 190; a command responder application 192 providing agent functions for remote operations, the application 192 having several applications for different remote operations, the application 192 including an attribute value reading function module 194 for performing Get operations, and an attribute value alternating function module 196 for performing Set operations; and a proxy forwarder application (not shown) providing procedures for relocating the destination and re-transmitting the messages.

Each of the signaling applications includes at least one procedure providing support for several concurrent processes. One signaling application must support many interoperations simultaneously. An independent process has to be established in a signaling application for each interoperation. The procedures are called by the external methods 154 of the network objects 106. The command generator application 188 and notification generator application 184 logically provide only one procedure respectively. The proxy forwarder application (not shown) provides procedures for relocating the destination and retransmitting the messages. The objects of an operation may not be in the network entity indicated by the command. In the case wherein the network entity receiving the command must relocate the destination and send the command to a new destination, the network entity provides the role of Proxy, Broker, or Dealer.

The notification receiver application 180 provides procedures for classifying, queuing and storing notifications for different destination network objects. The application 180 also receives events from the local network objects and reports the events to a designated remote network object. Events are passive actions, and operations are active actions. If and when an error arises in an object, a notification representing the event is transmitted to a designated network object in order to provide an alarm. The notification generator application 184 can be used for generating acknowledgment and confirm messages for a command. The notification receiver application 180 provides for receiving notifications from other network objects residing in the remote network entities and sending the notifications to local objects. The proxy forwarder (not shown) provides for relocating and redirecting messages for the case wherein the destination of the messages is in other network nodes.

The command generator application 188, which handles requests from the network objects, is a master of remote operations. The command responder application 192, which acts as an agent of the command generator application 188 of a remote signaling protocol entity, sends requests to network objects to perform an operation (e.g., create/delete a network object, get desired data from network objects) according to the primitive and the managed objects in the command received from a remote entity.

The command responder application 192 provides a plurality of procedures including: a create object procedure for creating new managed objects; a delete object procedure for deleting managed objects; a get managed object procedure for accessing values of the managed objects; and a set managed object procedure for alternating values of the managed objects. When a command is received, the command responder application 192 sends an indication message to the corresponding command generator application 188.

The notification receiver application 180 and notification originator application 184 provide for receiving and generating notifications and events. Notify messages are generated by the network objects 106 within the network entity and are sent via signaling protocol entities to other network objects within the same management domain for management purposes. Note that a management domain covers the network entities administrated by a society. A management station is responsible for the configuration, performance, and surveillance of these network entities. Event messages are also generated by the network objects 106 in the network entity and are sent to other network objects of remote network entities within the same community for control purposes.

The command generator application 188 and the command responder application 192 provide for remote operations. These applications provide functions such as tracking commands sent and received, maintaining the status and timer of the thread, surveying the status of remote operations, sending time-out messages to corresponding invoking ones of the objects 106, and sending confirm/failure messages to the other side of the protocol to objects in remote network entities. Note that an operation may consist of many steps. The steps can be represented by a directional flow graph. The collection of the connection lines between steps in the graph is called Thread. Thus, status of an operation is represented by a thread.

The command generator application 188 provides a master of remote operations including a set.request remote operation, a get.request remote operation, a create.request remote operation, and a delete.request remote operation. The command generator application 188 sends commands to remote network entities, and receives indication information from the remote network entities. If an indication has not reached, or has not been returned to, the command generator application after time-out within a specific time frame, the command generator application 188 sends a message to the network object that sent the command.

The message dispatcher 146 is operative to transfer messages between the network objects 106 and signaling applications 172. The messages, which flow logically from the signaling applications 172 to the network objects 106, are physically dispatched by the message dispatcher. If the interoperations between the network objects within the network entity are direct, the dispatcher 146 provides event handling functions within the network entity.

The external methods 154 of the network objects 106 provide interfacing between the objects and the applications 172 for interoperations. The output method 160 provides methods for calling functions in the signaling applications. The input message handling methods 156 provide for receiving messages representing remote operations performed on the corresponding network object. The interface management methods 158 provide for initiating, releasing, suspending, and resuming sessions which represents logical channels between objects, and also provide for requesting the status of a session in a signaling application. The output method 160 includes a get.request method, a set.request method, a get.response method, a set.response method, a notify method, an event method, a create.request method, a delete.request method, a create.response method, and a delete.response method. Methods are portions of an object. Thus, methods are called by other methods within an object. Note that commands can be considered as services provided by a protocol.

The signaling protocol engine 174 provides services to the signaling protocol applications 172 for conveying commands and notifications between the network entities 102 (FIG. 3A). The signaling protocol of the invention makes use of the structure of an SNMP protocol engine. The signaling engine 174 includes three layers over the UDP/IP message transmission layer of the IP network. The lowest layer is a Transport Mapping layer, the second layer is a message handling layer, and the third layer is a PDU handling layer. In the PDU handling layer, a PDU header is added to the messages generated by signaling applications. In the message handling layer, an SNMP header is added to the PDU's. SNMP messages are sent to the UDP layer for transmission on the IP network.

In order to support the features in the signaling protocol on the SNMP engine, two PDU formats for object creating and deleting are defined. If the signaling protocol is used in a trust domain, which indicated a sub-network allowing the access by authorized users, the signaling protocol engine can be developed based on an SNMP v1 engine. Otherwise the signaling protocol engine is based on the SNMP v3 engine. The security model of SNMP v3 is defined within the PDU handling layer and the access control model is in the message handling layer. In the case that the signaling protocol is used in SNMP v3, the security model and the access control model are managed by the network administration.

Messages may be transferred between the network objects 106 residing in the same network entity in accordance with direct interoperations as indicated by line 149, and may also be transferred between network objects 106 and the signaling applications 172 via the message dispatcher 146 as indicated by lines 148 and 149.

Messages including events and notifications received from other network objects of a remote network entity are transferred from the notification receiver application 180 to OBJECT_1 as illustrated by a line 200. Messages including events and notifications, to be delivered to other network objects of remote network entities for the purpose of reporting the events in the local OBJECT_1, are transferred from the output method 160 of OBJECT_1 to the notification originator application 184 as illustrated by a line 202. Messages used for Creating and Deleting remote objects, and for Getting and Setting remote objects are transferred from the output method 160 of OBJECT_1 to the command generator application 188 as illustrated by a line 204.

Messages indicating the status of remote processing in remote network objects of remote network entities are transferred from the command generator application 188 to the input message handling method 156 of OBJECT_1 as illustrated by a line 206. Messages including remote Get Commands, received from objects of remote network entities are transferred from the attribute reading function module 194 of the command responder application 192 to the input message handling method 156 of OBJECT_1 as illustrated by a line 208. A message indicating the results of a Get operation originally invoked by a remote network object is transferred from the output method 160 of OBJECT_1 to the attribute reading function module 194 of the command responder application 192 as illustrated by a line 210. A message indicating a Set operation invoked by a remote network object is transferred from the attribute values alternating function module 196 of the command responder application 192 to the input message handling method 156 of OBJECT_1 as illustrated by a line 212. A message indicating the results of a Set operation executed by OBJECT_1 and invoked by a remote network object of a remote network entity is transferred from the output method 160 of OBJECT_1 to the attribute alternating function module 196 of application 192 as illustrated by a line 214.

Signaling layer protocol messages, packaged by the PDU layers are transferred between signaling protocol entities via the network 176. A message including notification protocol data units (PDU's) is transferred from the signaling protocol engine 174 to the notification receiver application 180 as indicated by a line 220. A message including notification PDU's is transferred from the notification originator application 184 to the engine 174 as indicated by a line 222. A message including remote operations PDU's is transferred from the command generator application 188 to the engine 174 as indicated by a line 224. Messages including confirm information associated with remote operations are transferred from the signaling protocol engine 174 to the command generator application 188 as indicated by a line 226.

Messages including remote operation Get and Set PDU's are transferred from the engine 174 to the function modules 194 and 196 of the command responder application 192 via paths indicated by lines 228 and 232 respectively. Messages carrying responses of the remote operations are transferred from the attribute reading function module 194 and the alternating function module 196 to the engine 174 as indicated by lines 230 and 234 respectively. All of the above described messages transferred from the output method 160 of the network objects to the signaling applications 172 are actually dispatched by the message dispatcher 146. Likewise, all messages transferred from the signaling applications 172 to the input message handling method 156 of the network objects are actually dispatched by the message dispatcher 146.

FIG. 5 is a block diagram illustrating a first network entity 102 (FIG. 4) designated NETWORK_ENTITY_A having a network object 106 designated OBJECT_1.0.1.0, and a second network entity 102 (FIG. 4) designated NETWORK_ENTITY_B having a network object 106 designated OBJECT_2.2.0.1 in an IP network, the depicted entities executing a Get remote operation in the control and signaling system 100 (FIG. 3A). In order to execute the Get remote operation, the output method 160 of OBJECT_1.0.1.0 of the local ENTITY_A executes a get request method designated GET_REQUEST_2.2.0.1.1, and the output method 160 of OBJECT_2.2.0.1 of the remote ENTITY_B executes a get response method designated GET_RESPONSE_2.2.0.1.1

The Get operation is used to obtain value(s) of a set of attributes of a remote network object. In NETWORK_ENTITY_A, OBJECT_1.0.1.0 generates a Get Request message to get the value of an attribute 164 designated ATTRIBUTES_2.2.0.1.1 of a managed object mapped from the attributes 150 designated ATTRIBUTES_ABCDE of the remote OBJECT_2.2.0.1 of the remote NETWORK_ENTITY_B.

Initially, the interface management method 158 of OBJECT_1.0.1.0 establishes a connection with the command generator application 188 of ENTITY_A by sending a message to the command generator application 188 as indicated by a line 260. Then, the output method 160 of OBJECT_1.0.1.0 executes an external Get.request method to call a remote reading function in the command generator application 188. The external Get.request method is used to determine the ATTRIBUTES_ABCDE of the managed object associated with OBJECT_2.2.0.1 within NETWORK_ENTITY_B.

A message including final results of the remote operation is transferred from the command generator application 188 to the input message handling method 156 of OBJECT_1.0.1.0 as indicated by a line 264. A message indicating error information, such as time-out of the operation, is also transferred from application 188 to OBJECT_1.0.1.0 as indicated by a line 266. A message for getting the status of processing is transferred from the interface management method 158 of OBJECT_1.0.1.0 to application 188 as indicated by a line 268. A message including the requested status information is transferred from application 188 to module 158 of OBJECT_1.0.1.0 as indicated by a line 270.

The command generator application 188 generates a Get remote operation protocol data unit (Get remote operation PDU) with binding ATTRIBUTES_2.2.0.1.1 of the managed object stored in the MIB 142. Note that a PDU contains an operation and parameters. More than one object can be operated at once. Thus, many managed objects (attributes)

can be bound in a PDU. The PDU is conveyed to the signaling protocol engine 174 as indicated by a line 272. The command generator application 188 also receives PDU's from the engine 174 as indicated by a line 274, the PDU's comprising the results of the get operation or the error information from the signaling protocol entity 144 of the remote NETWORK_ENTITY_B. The signaling protocol engine 174 of NETWORK_ENTITY_A transfers the PDU's to the remote protocol engine 174 of NETWORK_ENTITY_B via the IP network 176.

The command responder application 192 of NETWORK_ENTITY_B sends a Get.confirm message to the command generator application 188 of NETWORK_ENTITY_A immediately to indicate that the Get command has been received. In the command responder application 192 of OBJECT_2.2.0.1, an attribute reading function is invoked by the remote command, that is the Get command received from OBJECT_1.0.1.0. The command responder application 192 also transfers the objects performing the operation to OBJECT_2.2.0.1 as indicated by a 280. Since OBJECT_2.2.0.1 knows the structure of its managed object, the value of ATTRIBUTES_ABCDE corresponding to the entry of the MANAGED_OBJECT_2.2.0.1.1 is obtained, and an external Get.response method is invoked in the output method 160 of OBJECT_2.2.0.1. In order to send results (e.g., success or failure, the value of ABCDE if success) of the Get operation back to OBJECT_1.0.1.0, the Get.response method calls a response generation function 193 in the command responder application 192 by sending a corresponding message to application 192 as indicated by a line 278. If OBJECT_2.2.0.1 has not sent a response to the command responder application 192 within a limited time (e.g., 2 seconds), a time-out message is sent to OBJECT_2.2.0.1 to cancel the process as indicated by a line 282, and an error message will be sent to the command generator application 188 of NETWORK_ENTITY_A.

Mapping is provided between OBJECT_2.2.0.1 and it's corresponding managed object having ATTRIBUTES_2.2.0.1.1 in the MIB 142 as indicated by lines 284 and 286. The mapping is only a logical relationship between a real object and the signaling protocol. For a Get operation, the mapping from network object attributes ATTRIBUTES_ABCDE to the attribute ATTRIBUTES_2.2.0.1.1 of the corresponding managed object may be either one-to-one, or many to one. If the mapping is one-to-one, the attribute of the managed object is read-only.

FIG. 6 is a block diagram illustrating a first network entity 102 (FIG. 4) designated ENTITY_C having a network object 106 designated OBJECT_1.1.1.0, and a second network entity 102 designated ENTITY_D having a network object 106 designated OBJECT_1.1.2.1 in the IP network, the depicted network entities executing a Set remote operation in the control and signaling system 100 (FIG. 3A). OBJECT_1.1.2.1 of ENTITY_D has a corresponding managed object (not shown) which includes corresponding attributes 164 designated ATTRIBUTES$_{13}$ 1.1.2.1.1. stored in the MIB 142. NETWORK_ENTITY_D is the remote protocol entity for the Set operation.

In order to execute the Set remote operation, the output method 160 of OBJECT_1.1.1.0 of the local ENTITY_C executes a set request function designated SET_REQUEST_1.1.2.1.1, and the output method 160 of OBJECT_1.1.2.1 of the remote ENTITY_D executes a set response function designated SET_RESPONSE_1.1.2.1.1 The flow of messages and processing for a Set operation are similar to those described above in reference to FIG. 5 for the Get operation. A Set operation is used to alternate one or more attributes of a remote network object with a set of values given by a network object invoking the command.

OBJECT_1.1.1.0 of NETWORK_ENTITY_C delivers a Set request message to alternate the value of ATTRIBUTES_1.1.2.1.1 of the managed object mapped from the ATTRIBUTES_ABCDE of OBJECT_1.1.2.1 of NETWORK_ENTITY_D. Initially, a message is transferred from the interface management unit 158 of OBJECT_1.1.1.0 to the command generator application 188 as illustrated by a line 310 in order to establish a connection between OBJECT_1.1.1.0 and the command generator application 188. Then, the output method 160 of OBJECT_1.1.1.0 executed SET_REQUEST_1.1.2.1.1 to call a remote writing command generating function module 304 in the command generator application. The output method 160 of OBJECT_1.1.1.0 transmits a Set.request message to the command generator application 188 as illustrated by a line 312. A message indicating final results of the remote operation is transferred from application 188 of NETWORK_ENTITY_C to the input message handling module 156 of OBJECT_1.1.1.0 as illustrated by a line 314.

A message for indicating error information such as time-out of the operation is transferred from application 188 of NETWORK_ENTITY_C to method 156 of OBJECT_1.1.1.0 as illustrated by a line 316. A message for getting the status of the processing is transferred from method 158 of OBJECT_1.1.1.0 to application 188 as illustrated by a line 318. A message including the obtained status information is transferred from application 188 to method 158 of OBJECT_1.1.1.0 as illustrated by a line 320.

The command generator application 188 of NETWORK_ENTITY_C generates a Set remote operation PDU with binding managed objects (1.1.2.1.1). A message including the PDU is conveyed from a remote writing command generating function 304 of application 188 to engine 174 as illustrated by a line 322.

The command generator application 188 also receives PDU's including the results of the Set operation, or error information, from the remote protocol entity 144 of NETWORK_ENTITY_D via the engine 174 as illustrated by a line 324. The signaling protocol engine transfers PDU's to the remote protocol engine 174 of NETWORK_ENTITY_D via the IP network 176.

The command responder application 192 of the remote NETWORK_ENTITY_D transfers PDU's including the results of the Set operation, or error information, to the engine 174 as illustrated by a line 340.

A message including the Set remote operation PDU with binding managed objects (1.1.2.1.1) is conveyed from engine 174 of NETWORK_ENTITY_D to the command responder application 192 as illustrated by a line 342. Messages transmitted as indicated by lines 322 and 342 contain substantially the same information, and likewise messages transmitted as indicated by lines 340 and 324 contain substantially the same information.

The command responder application 192 of NETWORK_ENTITY_D sends a Set.confirm message to the command generator application 188 of NETWORK_ENTITY_C immediately to indicate that the Set command has been received. In application 192 of remote NETWORK_ENTITY_D, an attribute writing response generation function module 306 is invoked by the remote command, that is the command delivered by the network object in a remote network entity. The command responder application 192 transfers the objects performing the operation to OBJECT_1.1.2.1 as illustrated by a line 330.

Because OBJECT_1.1.2.1 knows the structure of its managed object, the value of ATTRIBUTES_ABCDE corresponding to the entry of the managed object (1.1.2.1.1) is obtained, and the external Set.response method, SET_RESPONSE_1.1.2.1.1 is invoked by the output method 160 of OBJECT_1.1.2.1. The Set.response method 160 calls the Response Generation function 306 in the command responder application 192 as indicated by a line 332 to send a message including the results (success or failure) of the Set operation back to OBJECT_1.1.1.0 in NETWORK_ENTITY_C.

If OBJECT_1.1.2.1 has not sent a response to the command responder application 192 in a limited time (e.g., 2 seconds), a time-out message is sent to OBJECT_1.1.2.1 to cancel the process as indicated by a line 334. Subsequently, an error message sent to the command generator application.

Mapping is provided between OBJECT_1.1.2.1 and it's corresponding MANAGED_OBJECT_1.1.2.1.1 as indicated by lines 336 and 338. The mapping is only a logical relationship between a real object and the signaling protocol. For the Set operation, the mapping of network object attribute and the attribute of corresponding managed object is one-to-one.

FIG. 7 is a block diagram illustrating a first network entity 102 (FIG. 4) designated NETWORK_ENTITY_E having a network object 106 designated OBJECT_1.1.1.3, and a second network entity 102 designated NETWORK_ENTITY_F having a network object 106 designated OBJECT_1.3.2.1 in an IP network, the depicted network entities executing a Create operation in the control and signaling system 100 (FIG. 3A). OBJECT_1.3.2.1 of ENTITY_F has a corresponding managed object 108 designated OBJECT_1.3.2.2. NETWORK_ENTITY_F is the remote protocol entity for the Create operation.

In order to execute the create operation, the output method 160 of OBJECT_1.1.1.3 of the local ENTITY_E executes a create request function designated CREATE_REQUEST_1.3.2.2, and the output method 160 of OBJECT_1.3.2.1 of the remote ENTITY_F executes a create response function designated CREATE_RESPONSE_1.3.2.1. The flow of messages and processing for a Create operation are similar to those described above in reference to FIGS. 5 and 6 for the Get and Set operations.

The Create operation is used to derive a new network object 106 from an existing network object 106 wherein the new object and the existing object are in the same class and therefore have same attributes and methods. The attributes of the new network object will be assigned by a set of given values. The name of the new network object is assigned by the remote operation.

In simple cases, a created object is a new row of an existing table. The new network object has thus the same entries as other rows in the table. Such a new object can be created either from the adjacent row or from the table. Generally, a network object can be reproduced from any existing object by the Create operation.

OBJECT_1.1.1.3 of the local NETWORK_ENTITY_E delivers a remote Create request message to create a new object 106 designated OBJECT_1.3.2.2 in the remote NETWORK_ENTITY_F which is derived from OBJECT_1.3.2.1.

Initially, a Create.request message is transferred from the interface management unit 158 of OBJECT_1.1.1.3 to the command generator application 188 of NETWORK_ENTITY_E as illustrated by a line 350 in order to establish a connection between OBJECT_1.1.1.3 and application 188. Subsequently, output method 160 of OBJECT_1.1.1.3 executes the create request function designated CREATE_REQUEST_1.3.2.2, with a default value to call a remote creating function module 304 in the command generator application 188. The output method 160 of OBJECT_1.1.1.0 transmits a Create request message to the command generator application 188 as illustrated by a line 352.

A message indicating final results of the remote operation is transferred from the command generator application 188 of NETWORK_ENTITY_E to module 156 of OBJECT_1.1.1.3 as illustrated by a line 354. A message for indicating error information such as time-out of the operation is transferred from application 188 of NETWORK_ENTITY_C to OBJECT_1.1.1.3 as illustrated by a line 356.

A message for getting the status of the processing is transferred from OBJECT_1.1.1.3 to application 188 as illustrated by a line 358. A message including the obtained status information is transferred from application 188 to OBJECT_1.1.1.0 as illustrated by a line 360.

The command generator application 188 of NETWORK_ENTITY_E generates a Create remote operation PDU with binding default values of the new object. A message including the Create remote operation PDU is conveyed from module 361 of application 188 to engine 174 as illustrated by a line 362.

The command generator application 188 also receives PDU's including the results of the create operation or the error information from the remote protocol entity from engine 174 as illustrated by a line 364. The signaling protocol engine transfers PDU's to the remote protocol engine 174 of NETWORK_ENTITY_F via the IP network 176.

The command responder application 192 of the remote NETWORK_ENTITY_F sends a Create.confirm message to the command generator application 188 of NETWORK_ENTITY_E immediately to indicate the Create command has been received.

Messages transmitted as indicated by lines 362 and 382 contain substantially the same information, and likewise the messages transmitted as indicated by lines 380 and 364 contain substantially the same information.

In the command responder application 192, an Object Creating function is invoked by the remote command, that is a command delivered by a network object in a remote network entity. The command responder application 192 then transfers the binding values of the create operation to a OBJECT_1.3.2.1 as illustrated by a line 370. Because OBJECT_1.3.2.1 knows the structure of itself, the new network OBJECT_1.3.2.2 which has the same structure as OBJECT_1.3.2.1 is therefore created. The attributes of the new OBJECT_1.3.2.2 will be fulfilled by the given values.

The Create response function of module 160 calls the Response Generation function in the command responder application 192 by sending a message including the results (success or failure) of the Create operation back to OBJECT_1.1.1.3 in NETWORK_ENTITY_E as indicated by a line 372.

If OBJECT_1.3.2.1 has not sent a response to the command responder application 192 in a limited time (e.g., 2 seconds) after performing the Create operation, a time-out message is sent to OBJECT_1.3.2.1 to cancel the process as indicated by a line 374. An error message will be sent to the command generator application.

FIG. 8 is a block diagram generally illustrating message and PDU processing in the signaling protocol engine 174

(FIG. 4) of each of a pair of the network entities 140 illustrated LOCAL_ENTITY and DESTINATION_ENTITY.

The signaling protocol engine 174 in each of the network entities 140 (FIG. 4) relies on the support of UDP/IP protocols provided by the UDP/IP network 176 to encapsulate protocol data units (PDU's) generated by the signaling applications 172 into SNMP packages, UDP packages, and IP packages. The engine 174 also performs reverse processes to restore PDU's, and sends the PDU's to the corresponding signaling applications 172.

In the signaling protocol engine, a PDU & security process function module 400 provides for receiving PDU's from the signaling applications 172 as indicated by a line 402, and also provides for encrypting the PDU's if necessary. In an embodiment, the encryption is based on a security model designated by the network administration.

An SNMP Message Generation function module 404 receives the PDU's from module 400 as indicated by a line 406, and adds message headers to the PDU's in order to indicate the version of the signaling protocol. In the SNMP compatible MIB-based object-oriented signaling protocol of the present invention, an SNMP v3 message header is used. The SNMP v3 messages are sent from module 404 to a UDP Packaging function module 408 as indicated by a line 410.

The UDP Packaging function module 408 adds a UDP header to the SNMP v3 messages. The UDP packages are conveyed from module 408 to an IP Packaging function module 412 as illustrated by a line 414. The IP Packaging function module 412 adds the IP header to the UDP packages with destination address. IP packages are conveyed from module 412 to the IP network 176 as indicated by a line 416.

IP packages are received by an IP unpackaging function module 420 in the signaling protocol engine 174 of DESTINATION_ENTITY as illustrated by a line 422. The IP Unpackaging function module 420 restores the UDP packages, and send them to a UDP Unpackaging function module 424 as indicated by a line 426. A message handling function module 428 receives the restored SNMP v3 messages processed by the UDP unpackaging module 424 as indicated by a line 430. The message handling function module 428 handles the SNMP v3 messages to restore original PDU's, and results are sent from module 428 to an object access control function module 432 as indicated by a line 434. An access control mechanism restricts access for the managed objects according to an access control model designated by network administration. Authenticated PDU's are sent to the corresponding signaling application for more operation as indicated by a line 436.

An advantage of the signaling system of the present invention is that it provides an implicit common security mechanism for all control applications over the signaling protocol. Security is an important issue for the network control on non-private network. Function-oriented distributed control protocols over IP networks design specific security mechanisms respectively. It is very costly and complicated while many control protocols coexist in a network entity. The MIB-based signaling protocol provides common security mechanism for all control applications over the signaling protocol. On behalf of network maintenance and administration, this common security mechanism is a great feature of the invention. Since the security mechanism is compatible with the management security mechanism defined in SNMP v3, all management applications benefit from the security mechanism as well.

Another advantage of the signaling system of the present invention is that it provides implicit common community-based access control to protect against illegal access by network objects out of the community. In addition to providing a security mechanism for protecting the signaling PDU's, a context-based access control mechanism is offered at message level to protect against illegal access from the network objects out of the community. A specific MIB will be created for the access control while a community is established. The access control model for management purpose is also supported if the network administration assigns access control MIB's for management applications.

Yet another advantage of the signaling system of the present invention is that it supports session initiation functions for establishing sessions between endpoints before communication begins. Typical session initiation functions include registration with devices and users, admission control, address resolution, proxy, call redirection and object locating. In many IP-based applications, session initiation makes use of specific language, message and signaling function. Using the MIB-based signaling protocol, the session initiation functions are considered as network control applications over the signaling protocol. Network objects may be used to model proxy servers, object location servers, redirection servers, and admission control servers. Other network objects are able to access the servers using the primitives such as Create, Delete, Get and Set via the signaling protocol.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A process of providing access control of signaling services and operation oriented common signaling information services for supporting a plurality of different types of network distributed signaling functions in a network, the process comprising the steps of:

instantiating a class of network objects in a plurality of network entities forming a community, each of said network entities having at least one of said network objects of said class, said class of network objects for modeling a corresponding one of the network distributed signaling functions; and providing a transparent operation oriented interface between said network objects of said network entities of said community to enable interoperations between said network objects, said interface being provided by providing an operation oriented semantic independent signaling protocol entity in each of said network entities, said protocol entities providing object interoperations in control applications, each said protocol entity including a plurality of signaling applications operative to provide procedures for implementing said information services, each said protocol entity generating signaling protocol messages in response to primitives and associated parameters received from network objects, providing a signaling protocol engine including a protocol data unit layer for packaging said primitives and associated parameters to create said signaling protocol messages, and transmitting said signaling layer protocol messages between said signaling protocol entities via the network; and creating a management information base for common interoperation service, said management information base having a collection of attributes of managed objects in the network, each of said managed objects being mapped to a corresponding network object by public attributes of said corresponding network object, and wherein each of said network objects includes external methods for accessing managed objects associated with other ones of said network objects via said interface, said external methods being operative to perform network operations, and also being operative to invoke the performance of network operations by other network objects in said community, said network objects reflecting behaviors of said network entities and said interoperations between said network entities.

2. A process as recited in claim 1 wherein each of said network objects further includes external interfacing for calling said procedures provided by said signaling applications in order to use corresponding ones of said services for supporting interoperations between network objects of different ones of the network entities.

3. A process as recited in claim 1 wherein a portion of said signaling protocol messages including packaged primitives and associated parameters, said packaged primitives being operation oriented semantic independent primitives which support the plurality of different types of network distributed signaling functions.

4. A process as recited in claim 1 wherein said operation oriented semantic independent primitives are used to specify operations to be performed by selected ones of said network objects, said operations comprising:
   a get operation for accessing values of managed objects;
   a set operation for alternating values of managed objects;
   a create object operation for creating new managed objects; and
   a delete object operation for deleting managed objects.

5. A process as recited in claim 4 wherein said operations further include
   a notify operation for providing notification messages to remote network objects regarding network management issues; and
   an event operation for providing event messages to remote network objects regarding network control issues.

6. A process as recited in claim 5 wherein said operation oriented semantic independent primitives include generic primitives for indicating a type of operation to be performed by a network object, and specific primitives indicating a behavior of said operation.

7. A process as recited in claim 6 wherein:
   said generic primitives include get primitives for accessing values of managed objects, set primitives for alternating values of managed objects, create primitives for creating new managed objects, delete primitives for deleting managed objects, event primitives for providing event messages to remote network objects regarding network control issues, and notify primitives for providing notification messages to remote network objects regarding network management issues; and
   said specific primitives include request primitives for requesting performance of a corresponding one of said operations, status primitives for indicating a status of a corresponding process, response primitives for providing a response to a get command, confirmed primitives for indicating execution and receipt of a get command, and indication primitives for indicating a status and error in a corresponding process.

8. A process as recited in claim 1 wherein each of said network objects further includes an input message handling method for receiving messages from a corresponding signaling protocol entity.

9. A process as recited in claim 1 wherein said network is a user datagram protocol (UDP) over internet protocol (IP) network, and wherein a signaling protocol provided by the process is mapped to UDP.

10. A process as recited in claim 1 wherein said plurality of network entities forming a community comprise a point to point connection.

11. A process as recited in claim 1 wherein said plurality of network entities forming a community comprise a point to multipoint connection.

12. A process as recited in claim 1 wherein said step of providing a transparent operation oriented interface comprises the steps of:
   calling procedures for supporting the common signaling information services for providing services to higher layer applications; and
   conveying commands and notifications between said network entities of said community, and for providing services to said signaling protocol application.

13. A process as recited in claim 1 wherein each of said network objects further includes interface management methods for managing connections between said network objects and said signaling applications.

14. A process as recited in claim 1 wherein said signaling protocol engine includes comprises a simple network management protocol (SNMP) engine.

15. A process as recited in claim 1 wherein said signaling protocol engine includes a simple network management protocol (SNMP) engine having a security model and an access control model.

16. A process as recited in claim 1 wherein said operation oriented common signaling information services are used for supporting distributed network control function in the a data link layer, a network layer, a session layer, and an application layer of a network.

17. A process as recited in claim 1 wherein said signaling applications comprise:
   a command generator application providing a procedure for sending commands to remote network entities, and for receiving indication information from remote network entities; and
   a command responder application providing a procedure for sending requests to local network objects to perform an operation in response to commands received from a remote network entity.

18. A process as recited in claim 17 wherein said signaling applications comprise:
   a notification generator application providing a procedure for generating acknowledgment and confirm messages in response to messages received from a remote network entity;
   a notification receiver application providing procedures for classifying, queuing and, storing notifications destined for corresponding network objects.

19. A process as recited in claim 17 wherein said command generator application and said command responder application are operative to track each command sent and received, maintain the status and timer of a thread, survey the status of remote operations, send time out messages to an invoking object, and send confirm/failure messages.

20. A process as recited in claim 1 wherein each of said managed objects is defined in accordance with structure of management information (SMI).

21. A process as recited in claim 1 wherein said operation oriented common signaling information services are used interworking across network layers within one of said network entities.

22. A process as recited in claim 1 wherein said operation oriented common signaling information services are used for interoperations between networks in a heterogeneous network environment.

23. A process as recited in claim 1 wherein said operation oriented common signaling information services are used for network control purposes on interfaces between network management stations.

24. A process as recited in claim 1 wherein said network distributed signaling functions comprise link setup functions, connection setup functions, call processing functions, protection functions, restoration functions, automatic configuration functions, test functions, and capacity exchange functions.

25. An object oriented signaling system for providing access control of signaling services and operation oriented common signaling information services for supporting a plurality of different types of network distributed signaling functions in a network, the system comprising:
  a class of network objects instantiated in a plurality of network entities forming a community, each of said network entities having at least one of said network objects of said class, said class of network objects for modeling a corresponding one of the network distributed signaling functions; and
  a transparent operation oriented interface enabling interoperations between said network objects of said network entities of said community, said interface including,
    an operation oriented semantic independent signaling protocol entity provided in each of said network entities, said protocol entities providing object interoperations in control applications, each said protocol entity including a plurality of signaling applications operative to provide procedures for implementing said information services, each said protocol entity generating signaling protocol messages in response to primitives and associated parameters received from network objects,
    a signaling protocol engine including a protocol data unit layer for packaging said primitives and associated parameters to create said signaling protocol messages, and
    signaling layer protocol messages transmitted between said signaling protocol entities via the network; and
  a management information base providing common interoperation service, said management information base having a collection of attributes of managed objects in the network, each of said managed objects being mapped to a corresponding network object by public attributes of said corresponding network object, and wherein each of said network objects includes external methods for accessing managed objects associated with other ones of said network objects via said interface, said external methods being operative to perform network operations, and also being operative to invoke the performance of network operations by other network objects in said community, said network objects reflecting behaviors of said network entities and said interoperations between said network entities.

26. An object oriented signaling system as recited in claim 25 wherein said operation oriented common signaling information services are used for interoperations between networks in a heterogeneous network environment.

27. An object oriented signaling system as recited in claim 25 wherein said operation oriented common signaling information services are used for network control purposes on interfaces between network management stations.

28. An object oriented signaling system as recited in claim 25 wherein said network distributed signaling functions comprise link setup functions, connection setup functions, call processing functions, protection functions, restoration functions, automatic configuration functions, test functions, and capacity exchange functions.

29. An object oriented signaling system as recited in claim 25 wherein each of said network objects further includes external interfacing for calling said procedures provided by said signaling applications in order to use corresponding ones of said services for supporting interoperations between network objects of different ones of the network entities.

30. An object oriented signaling system as recited in claim 25 wherein a portion of said signaling protocol messages includes packaged primitives and associated parameters, said packaged primitives being operation oriented semantic independent primitives which support the plurality of different types of network distributed signaling functions.

31. An object oriented signaling system as recited in claim 25 wherein said operation oriented semantic independent primitives are used to specify operations to be performed by selected ones of said network objects, said operations including:
  a get operation for accessing values of managed objects;
  a get operation for alternating values of managed objects;
  a create object operation for creating new managed objects; and
  a delete object operation for deleting managed objects.

32. An object oriented signaling system as recited in claim 31 wherein said operations further include
  a notify operation for providing notification messages to remote network objects regarding network management issues; and
  an event operation for providing event messages to remote network objects regarding network control issues.

33. An object oriented signaling system as recited in claim 32 wherein said operation oriented semantic independent primitives include generic primitives for indicating a type of operation to be performed by a network object, and specific primitives indicating a behavior of said operation.

34. An object oriented signaling system as recited in claim 33 wherein:
  said generic primitives include get primitives for accessing values of managed objects, set primitives for alternating values of managed objects, create primitives for creating new managed objects, delete primitives for deleting managed objects, event primitives for providing event messages to remote network objects regarding network control issues, and notify primitives for providing notification messages to remote network objects regarding network management issues; and
  said specific primitives include request primitives for requesting performance of a corresponding one of said operations, status primitives for indicating a status of a corresponding process, response primitives for providing a response to a get command, confirmed primitives for indicating execution and receipt of a get command, and indication primitives for indicating a status and error in a corresponding process.

35. An object oriented signaling system as recited in claim 25 wherein each of said network objects further includes an input message handling method for receiving messages from a corresponding signaling protocol entity.

36. An object oriented signaling system as recited in claim 25 wherein said network is a user datagram protocol (UDP) over internet protocol (IP) network, and wherein a signaling protocol provided by the system is mapped to UDP.

37. An object oriented signaling system as recited in claim 25 wherein said plurality of network entities forming a community comprise a point to point connection.

38. An object oriented signaling system as recited in claim 25 wherein said plurality of network entities forming a community comprise a point to multipoint connection.

39. An object oriented signaling system as recited in claim 25 wherein each of said network objects further includes interface management methods for managing connections between said network objects and said signaling applications.

40. An object oriented signaling system as recited in claim 25 wherein said signaling protocol engine includes comprises a simple network management protocol (SNMP) engine.

41. An object oriented signaling system as recited in claim 25 wherein said signaling protocol engine includes comprises a simple network management protocol (SNMP) engine having a security model and an access control model.

42. An object oriented signaling system as recited in claim 25 wherein said operation oriented common signaling information services are used for supporting distributed network control function in the a data link layer, a network layer, a session layer, and an application layer of a network.

43. An object oriented signaling system as recited in claim 25 wherein said signaling applications comprise:
   a command generator application providing a procedure for sending commands to remote network entities, and for receiving indication information from remote network entities; and
   a command responder application providing a procedure for sending requests to local network objects to perform an operation in response to commands received from a remote network entity.

44. An object oriented signaling system as recited in claim 43 wherein said signaling applications comprise:
   a notification generator application providing a procedure for generating acknowledgment and confirm messages in response to messages received from a remote network entity;
   a notification receiver application providing procedures for classifying, queuing and, storing notifications destined for corresponding network objects.

45. An object oriented signaling system as recited in claim 43 wherein said command generator application and said command responder application are operative to track each command sent and received, maintain the status and timer of a thread, survey the status of remote operations, send time out messages to an invoking object, and send confirm/failure messages.

46. An object oriented signaling system as recited in claim 25 wherein each of said managed objects is defined in accordance with structure of management information (SMI).

47. An object oriented signaling system as recited in claim 25 wherein said operation oriented common signaling information services are used for interworking across network layers within one of said network entities.

* * * * *